United States Patent
He et al.

(10) Patent No.: US 11,477,655 B2
(45) Date of Patent: *Oct. 18, 2022

(54) METHOD AND DEVICE FOR PERFORMING COMMUNICATION BY USING VIRTUAL SUBSCRIBER IDENTITY MODULE

(71) Applicant: HUAWEI TECHNOLOGIES CO., LTD., Guangdong (CN)

(72) Inventors: Ruifeng He, Shenzhen (CN); Yan Li, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/086,788

(22) Filed: Nov. 2, 2020

(65) Prior Publication Data

US 2021/0051470 A1  Feb. 18, 2021

Related U.S. Application Data

(63) Continuation of application No. 16/317,560, filed as application No. PCT/CN2016/090077 on Jul. 14, 2016, now Pat. No. 10,856,142.

(51) Int. Cl.
*H04W 12/42* (2021.01)
*H04W 4/021* (2018.01)
(Continued)

(52) U.S. Cl.
CPC ............. *H04W 12/42* (2021.01); *H04W 4/00* (2013.01); *H04W 4/022* (2013.01); *H04W 12/43* (2021.01);
(Continued)

(58) Field of Classification Search
CPC ..... H04W 12/42; H04W 12/43; H04W 12/45; H04W 12/63; H04W 4/00; H04W 4/022; H04W 40/22
(Continued)

(56) References Cited

U.S. PATENT DOCUMENTS 6,708,033 B1 * 3/2004 Linkola .................. H04W 8/18
455/407
9,820,085 B1 * 11/2017 Telang .................. H04W 76/14
(Continued)

FOREIGN PATENT DOCUMENTS

CA      2852375 C  * 12/2020  ............ H04M 15/41
CN    103124440 A     5/2013
(Continued)

OTHER PUBLICATIONS

3GPP TS 43.020 V13.2.0 (Jun. 2016), 3rd Generation Partnership Project;Technical Specification Group Services and system Aspects;Security related network functions(Release 13), Jun. 2016, 123 pages.
(Continued)

*Primary Examiner* — Mong-Thuy T Tran

(57) ABSTRACT

A method and a device for performing communication by using a virtual subscriber identity module are used to provide a mode in which the device can perform communication without a SIM card. The method includes: receiving, by a first device, a virtual subscriber identity module data package sent by a second device by using a short range communications protocol, where the virtual subscriber identity module data package carries a virtual subscriber identity, and the virtual subscriber identity is used to uniquely identify a user using the first device when the first device performs communication in a network provided by a mobile communications operator; obtaining, by the first device, the virtual subscriber identity by using the virtual subscriber identity module data package; and communicating, by the first device by using the virtual subscriber identity, with another device in the network provided by the mobile communications operator.

29 Claims, 8 Drawing Sheets

(51) Int. Cl.
*H04W 4/00* (2018.01)
*H04W 12/43* (2021.01)
*H04W 12/45* (2021.01)
*H04W 12/63* (2021.01)
*H04W 40/22* (2009.01)

(52) U.S. Cl.
CPC .......... *H04W 12/45* (2021.01); *H04W 12/63* (2021.01); *H04W 40/22* (2013.01)

(58) Field of Classification Search
USPC ........................................................ 455/410
See application file for complete search history.

(56) References Cited

U.S. PATENT DOCUMENTS

| | | | |
|---|---|---|---|
| 10,278,062 B2* | 4/2019 | Wane | H04W 12/35 |
| 2007/0130465 A1* | 6/2007 | Zeng | G06F 21/31 |
| | | | 713/171 |
| 2010/0062770 A1 | 3/2010 | Flynn et al. | |
| 2010/0088188 A1 | 4/2010 | Kumar et al. | |
| 2010/0248690 A1 | 9/2010 | Biggs et al. | |
| 2010/0311391 A1 | 12/2010 | Siu et al. | |
| 2010/0311402 A1 | 12/2010 | Srinivasan et al. | |
| 2012/0172016 A1 | 7/2012 | Veneroso et al. | |
| 2012/0294275 A1* | 11/2012 | Krishnaswamy | ............. |
| | | | H04W 36/0055 |
| | | | 370/331 |
| 2013/0095784 A1* | 4/2013 | Jerath | H04M 15/765 |
| | | | 455/406 |
| 2013/0339512 A1 | 12/2013 | Hjelm et al. | |
| 2014/0148123 A1 | 5/2014 | Raleigh et al. | |
| 2014/0254499 A1 | 9/2014 | Hassan et al. | |
| 2015/0057044 A1* | 2/2015 | Altman | H04M 15/8055 |
| | | | 455/558 |
| 2015/0079935 A1* | 3/2015 | Maguire | H04W 12/06 |
| | | | 455/411 |
| 2016/0021489 A1 | 1/2016 | Yim et al. | |
| 2016/0037340 A1* | 2/2016 | Rayment | H04W 12/06 |
| | | | 370/338 |
| 2016/0088465 A1* | 3/2016 | Golla | H04W 12/04 |
| | | | 455/450 |
| 2016/0142908 A1* | 5/2016 | Lin | H04W 8/205 |
| | | | 455/435.1 |
| 2016/0150052 A1 | 5/2016 | Salmela et al. | |
| 2016/0150350 A1* | 5/2016 | Ingale | H04W 12/33 |
| | | | 370/255 |
| 2016/0164883 A1* | 6/2016 | Li | H04L 63/0853 |
| | | | 726/7 |
| 2016/0227403 A1* | 8/2016 | Narasimha | H04W 12/06 |
| 2017/0070346 A1* | 3/2017 | Lombardi | H04W 12/08 |
| 2017/0195869 A1* | 7/2017 | Knudsen | H04W 8/18 |
| 2019/0191356 A1* | 6/2019 | Norp | H04W 88/04 |
| 2020/0296572 A1* | 9/2020 | Bachmutsky | H04W 12/61 |

FOREIGN PATENT DOCUMENTS

| | | |
|---|---|---|
| CN | 103370950 A | 10/2013 |
| CN | 103916844 A | 7/2014 |
| CN | 104185176 A | 12/2014 |
| CN | 104754579 A | 7/2015 |
| CN | 104796957 A | 7/2015 |
| CN | 104902463 A | 9/2015 |
| CN | 104955022 A | 9/2015 |
| CN | 105049559 A | 11/2015 |
| CN | 105071824 A | 11/2015 |
| CN | 105338516 A | 2/2016 |
| CN | 105340308 A | 2/2016 |
| CN | 105554687 A | 5/2016 |
| CN | 105636013 A | 6/2016 |
| CN | 105657818 A | 6/2016 |
| WO | 2008040964 A2 | 4/2008 |

OTHER PUBLICATIONS

Zhang Bo, Mobile WLAN Security Protection, Call for Papers at the 2003 Annual Meeting of the Technical Committee on Information and Communication Networks, with an English Abstract, total 6 pages.

* cited by examiner

METHOD AND DEVICE FOR PERFORMING COMMUNICATION BY USING VIRTUAL SUBSCRIBER IDENTITY MODULE

CROSS-REFERENCE TO RELATED APPLICATIONS

This application is a continuation application of U.S. patent application Ser. No. 16/317,560, filed on Jan. 13, 2019, which is a National Stage of International Application No. PCT/CN2016/090077, filed on Jul. 14, 2016. All of the aforementioned patent applications are hereby incorporated by reference in their entireties.

TECHNICAL FIELD

The present invention relates to the field of communications technologies, and in particular, to a method and a device for performing communication by using a virtual subscriber identity module.

BACKGROUND

Currently, if a device such as a mobile router or a tablet computer (PAD) wants to connect to a mobile network, usually a physical subscriber identity module SIM (Subscriber Identity Module) card needs to be purchased, and the device accesses the mobile network by using the physical SIM card. However, volumes of some wearable devices, for example, a smart watch, are relatively small, and it may be relatively difficult to dispose physical SIM cards in these devices. Therefore, to connect to the mobile network, all these devices usually depend on other devices. For example, to access the mobile network, a smart watch may depend on a mobile phone. The smart watch may connect to the mobile phone by using Bluetooth (Bluetooth) or the like, and therefore a connection between the smart watch and the mobile network is implemented by using a physical SIM card in the mobile phone. In this case, the wearable device actually cannot directly connect to the mobile network, but communicates with the mobile network only indirectly by using the mobile phone.

As can be seen, currently if a device wants to connect to the mobile network, the device basically needs to depend on a physical SIM card. This causes a limitation on communication of the device.

SUMMARY

Embodiments of the present invention provide a method and a device for performing communication by using a virtual subscriber identity module, so as to provide a mode in which the device can perform communication without a physical SIM card.

According to a first aspect, a method for performing communication by using a virtual subscriber identity module is provided and includes: a first device receives a virtual subscriber identity module data package sent by a second device by using a short range communications protocol, where the virtual subscriber identity module data package carries a virtual subscriber identity, and the virtual subscriber identity is used to uniquely identify a user using the first device when the first device performs communication in a network provided by a mobile communications operator; the first device obtains the virtual subscriber identity by using the virtual subscriber identity module data package; and the first device communicates, by using the virtual subscriber identity, with another device in the network provided by the mobile communications operator.

In an embodiment of the present invention, no physical SIM card needs to be disposed in the first device. The first device can obtain the virtual subscriber identity by using the virtual subscriber identity module data package sent by the second device, and therefore can perform communication by using the virtual subscriber identity in the network provided by the mobile communications operator. This reduces dependence of the first device on a physical SIM card, and reduces hardware costs of the first device. Because no physical SIM card is required, space in the first device may also be saved. In addition, because a limitation on communication of the first device is reduced, the first device can be used more conveniently. In addition, the first device can directly communicate, by using the virtual subscriber identity, with another device in the network provided by the mobile communications operator, and no longer depends on another device serving as a relay. The communication mode is simpler and more convenient.

With reference to the first aspect, in a first possible implementation of the first aspect, before the first device receives the virtual subscriber identity module data package sent by the second device by using the short range communications protocol, the first device receives a virtual subscriber identity module installation package sent by the second device by using the short range communications protocol; and the first device runs the virtual subscriber identity module installation package to obtain the installed virtual subscriber identity module.

Because the first device may need to process, by using the virtual subscriber identity module, the virtual subscriber identity module data package to obtain the virtual subscriber identity, if the virtual subscriber identity module is a module in a software form, a task of processing the virtual subscriber identity module data package can be completed only after the virtual subscriber identity module is installed in the first device. The first device can directly obtain the virtual subscriber identity module installation package directly by using the second device, without using another channel. This reduces a time required by the first device to search for the virtual subscriber identity module installation package, and improves processing efficiency of the first device.

With reference to the first aspect or the first possible implementation of the first aspect, in a second possible implementation of the first aspect, that the first device obtains the virtual subscriber identity by using the virtual subscriber identity module data package may be implemented in the following manner: The first device obtains the virtual subscriber identity carried in the virtual subscriber identity module data package.

That is, the virtual subscriber identity module data package may directly carry the virtual subscriber identity. Therefore, the first device can obtain the virtual subscriber identity by using the virtual subscriber identity module data package, and can use the virtual subscriber identity. The manner of obtaining the virtual subscriber identity is relatively simple.

With reference to the first aspect or the first possible implementation of the first aspect, in a third possible implementation of the first aspect, that the first device obtains the virtual subscriber identity by using the virtual subscriber identity module data package may be implemented in the following manner: The first device obtains check information carried in the virtual subscriber identity module data package, where the check information is used by the first device to obtain the virtual subscriber identity; the first device sends, to a server provided by the mobile communications operator, request information used to request to obtain the virtual subscriber identity, where the request information carries the check information; and the first device receives the virtual subscriber identity sent by the server after the check information is verified successfully.

That is, the virtual subscriber identity module data package may carry the check information, and the first device needs to obtain the virtual subscriber identity after the server performs verification successfully. This enhances security of the virtual subscriber identity, and reduces a possibility that the virtual subscriber identity is stolen.

The second device not only allocates the virtual subscriber identity to the first device, but also can manage the virtual subscriber identity allocated to the first device, so as to better control the allocated virtual subscriber identity, and avoid uncontrollability of the virtual subscriber identity as much as possible. When the second device manages the virtual subscriber identity, different management manners may be available. The following describes the management manners separately.

With reference to any one of the first aspect, or the first possible implementation to the third possible implementation of the first aspect, in a fourth possible implementation of the first aspect, the first device may further obtain time information carried in the virtual subscriber identity module data package; and the first device determines, according to the time information, a term of authority to use the virtual subscriber identity.

In this management manner, the second device may add the time information to the virtual subscriber identity module data package, and the time information may indicate the term of the authority to use the virtual subscriber identity. Therefore, the second device may control, according to the term indicated by the time information, the authority of the first device to use the virtual subscriber identity. For example, when the term indicated by the time information expires, the second device may update the authority to use the virtual subscriber identity, so as to manage the virtual subscriber identity.

With reference to any one of the first aspect, or the first possible implementation to the fourth possible implementation of the first aspect, in a fifth possible implementation of the first aspect, the first device may further obtain location information carried in the virtual subscriber identity module data package, where the location information is associated with the term of the authority to use the virtual subscriber identity; and the first device may determine, according to the location information, the authority to use the virtual subscriber identity.

In this management manner, the second device may add the location information to the virtual subscriber identity module data package, and the location information may be associated with the authority to use the virtual subscriber identity. For example, different locations indicated by the location information correspond to different authority to use the virtual subscriber identity. Therefore, the second device may control, according to a location indicated by the location information, the authority of the first device to use the virtual subscriber identity. For example, when the first device moves from the location indicated by the location information to another location, the second device may update the authority to use the virtual subscriber identity, so as to manage the virtual subscriber identity.

With reference to any one of the first aspect, or the first possible implementation to the fifth possible implementation of the first aspect, in a sixth possible implementation of the first aspect, if the first device determines that a short range communications connection to the second device is broken, the first device determines to stop using all or some functions of the virtual subscriber identity, or determines to stop using the virtual subscriber identity.

In this management manner, if the second device determines that the short range communications connection to the first device is broken, the second device may update the authority of the first device to use the virtual subscriber identity, so as to ensure controllability of the virtual subscriber identity as much as possible.

According to a second aspect, a method for allocating a virtual subscriber identity is provided, and the method includes: a second device generates a virtual subscriber identity module data package, where the virtual subscriber identity module data package carries a virtual subscriber identity, and the virtual subscriber identity is used to perform communication in a network provided by a mobile communications operator; and the second device sends the virtual subscriber identity module data package to a first device by using a short range communications protocol.

No physical SIM card needs to be disposed in the first device. The first device can obtain the virtual subscriber identity by using the virtual subscriber identity module data package sent by the second device, and therefore can perform communication by using the virtual subscriber identity in the network provided by the mobile communications operator. This reduces dependence of the first device on a physical SIM card, and reduces hardware costs of the first device. Because no physical SIM card is required, space in the first device may also be saved. In addition, because a limitation on communication of the first device is reduced, the first device can be used more conveniently. The second device can allocate the virtual subscriber identity to the first device only by using the virtual subscriber identity module data package. This manner is relatively simple.

With reference to the second aspect, in a first possible implementation of the second aspect, before the second device generates the virtual subscriber identity module data package, the second device may send a virtual subscriber identity module installation package to the first device by using the short range communications protocol, where the virtual subscriber identity module installation package is used to obtain an installed virtual subscriber identity module after the first device runs the virtual subscriber identity module installation package, and the virtual subscriber identity module is a software package used to process the virtual subscriber identity module data package and obtain the virtual subscriber identity.

If the virtual subscriber identity module is represented in a software form, and the virtual subscriber identity module is not installed on the first device, the second device may first send the virtual subscriber identity module installation package to the first device, and therefore, the first device may install the virtual subscriber identity module to process the virtual subscriber identity module data package.

With reference to the second aspect or the first possible implementation of the second aspect, in a second possible implementation of the second aspect, before the second device generates the virtual subscriber identity module data package, the second device sends an allocation request message to a server provided by the mobile communications operator, where the allocation request message is used to request to allocate the virtual subscriber identity; and the second device receives the virtual subscriber identity sent by the server, or check information used to obtain the virtual subscriber identity.

If no virtual subscriber identity is preset in the second device, the second device needs to first obtain the virtual subscriber identity. The second device may obtain the virtual subscriber identity from the server provided by the mobile communications operator. When allocating the virtual subscriber identity to the second device, the server may directly send the virtual subscriber identity to the second device. In this case, the second device may directly obtain the virtual subscriber identity, and this is relatively convenient. Alternatively, the server may send the check information to the second device, so that the virtual subscriber identity can be obtained subsequently only after the server verifies the check information successfully. This enhances security of the virtual subscriber identity.

The second device not only allocates the virtual subscriber identity to the first device, but also can manage the virtual subscriber identity allocated to the first device, so as to better control the allocated virtual subscriber identity, and avoid uncontrollability of the virtual subscriber identity as much as possible. When the second device manages the virtual subscriber identity, different management manners may be available. The following describes the management manners separately.

With reference to the second aspect, or the first possible implementation or the second possible implementation of the second aspect, in a third possible implementation of the second aspect, the virtual subscriber identity module data package carries time information, and the time information is used to indicate a term of authority to use the virtual subscriber identity.

In this management manner, the second device may add the time information to the virtual subscriber identity module data package, and the time information may indicate the term of the authority to use the virtual subscriber identity. Therefore, the second device may control, according to the term indicated by the time information, the authority of the first device to use the virtual subscriber identity. For example, when the term indicated by the time information expires, the second device may update the authority to use the virtual subscriber identity, so as to manage the virtual subscriber identity.

With reference to any one of the second aspect, or the first possible implementation to the third possible implementation of the second aspect, in a fourth possible implementation of the first aspect, the virtual subscriber identity module data package carries location information, and different location information corresponds to different authority to use the virtual subscriber identity.

In this management manner, the second device may add the location information to the virtual subscriber identity module data package, and the location information may be associated with the authority to use the virtual subscriber identity. For example, different location information indicates different use authority. For another example, different locations indicated by the location information correspond to different authority to use the virtual subscriber identity. Therefore, the second device may control, according to a location indicated by the location information, the authority of the first device to use the virtual subscriber identity. For example, when the first device moves from the location indicated by the location information to another location, the second device may update the authority to use the virtual subscriber identity, so as to manage the virtual subscriber identity.

With reference to any one of the second aspect, or the first possible implementation to the fourth possible implementation of the second aspect, in a fifth possible implementation of the first aspect, after the second device sends the virtual subscriber identity module data package to the first device, the second device determines that a short range communications connection between the first device and the second device is broken; and the second device updates the authority to use the virtual subscriber identity, so that the first device stops using all or some functions of the virtual subscriber identity or that the first device stops using the virtual subscriber identity.

In this management manner, if the second device determines that the short range communications connection to the first device is broken, the second device may update the authority of the first device to use the virtual subscriber identity, so as to ensure as much as possible that the virtual subscriber identity is in a controllable range.

According to a third aspect, a use authority control method is provided, and the method includes: after determining that at least one first device communicating with a second device by using a short range communications protocol obtains a virtual subscriber identity respectively, the second device determines that a target first device satisfies a condition for updating authority to use a virtual subscriber identity; and the second device updates the authority to use the virtual subscriber identity obtained by the target first device.

That is, the second device can manage the virtual subscriber identity of the first device, so that the virtual subscriber identity of the first device is in a controllable state as much as possible. In the third aspect, the second device may be used as a controlling end, the first device may be used as a controlled end, and the virtual subscriber identity used by the first device is controlled by the second device.

With reference to the third aspect, in a first possible implementation of the third aspect, that the second device updates the authority to use the virtual subscriber identity obtained by the target first device may be implemented in the following manner: The second device forbids the target first device to use all or some functions of the obtained virtual subscriber identity; or the second device forbids the target first device to use the obtained virtual subscriber identity.

Several manners of updating the authority to use the virtual subscriber identity are provided. The second device may select different manners according to different situations. This is relatively flexible. In addition, a plurality of updating manners are available. For different virtual subscriber identities, different updating manners may be used to perform updating, so that management is more efficient.

According to a fourth aspect, a device for performing communication by using a virtual subscriber identity module is provided, and the device includes: a short range communications module, configured to receive a virtual subscriber identity module data package sent by a second device by using a short range communications protocol, where the virtual subscriber identity module data package carries a virtual subscriber identity, and the virtual subscriber identity is used to uniquely identify a user using the device for performing communication by using a virtual subscriber identity module when the device for performing communication by using a virtual subscriber identity module performs communication in a network provided by a mobile communications operator; a processor, configured to obtain the virtual subscriber identity by using the virtual subscriber identity module data package received by the short range communications module; and a radio frequency unit, configured to communicate with another device by using the virtual subscriber identity in the network provided by the mobile communications operator.

With reference to the fourth aspect, in a first possible implementation of the fourth aspect, the short range communications module is further configured to receive a virtual subscriber identity module installation package sent by the second device by using the short range communications protocol; and the processor is further configured to run the virtual subscriber identity module installation package to obtain the installed virtual subscriber identity module.

With reference to the fourth aspect or the first possible implementation of the fourth aspect, in a second possible implementation of the fourth aspect, that the processor obtains the virtual subscriber identity by using the virtual subscriber identity module data package received by the short range communications module may be implemented in the following manner: The processor obtains the virtual subscriber identity carried in the virtual subscriber identity module data package.

With reference to the fourth aspect or the first possible implementation of the fourth aspect, in a third possible implementation of the fourth aspect, that the processor obtains the virtual subscriber identity by using the virtual subscriber identity module data package received by the short range communications module may be implemented in the following manner: The processor obtains check information carried in the virtual subscriber identity module data package, where the check information is used by the first device to obtain the virtual subscriber identity; the processor sends, by using the radio frequency unit to a server provided by the mobile communications operator, request information used to request to obtain the virtual subscriber identity, where the request information carries the check information; and the processor receives, by using the radio frequency unit, the virtual subscriber identity sent by the server after the check information is verified successfully.

With reference to any one of the fourth aspect, or the first possible implementation to the third possible implementation of the fourth aspect, in a fourth possible implementation of the fourth aspect, the processor is further configured to: obtain time information carried in the virtual subscriber identity module data package; and determine, according to the time information, a term of authority to use the virtual subscriber identity.

With reference to any one of the fourth aspect, or the first possible implementation to the fourth possible implementation of the fourth aspect, in a fifth possible implementation of the fourth aspect, the processor is further configured to: obtain location information carried in the virtual subscriber identity module data package, where the location information is associated with the term of the authority to use the virtual subscriber identity; and determine, according to the location information, the authority to use the virtual subscriber identity.

With reference to any one of the fourth aspect, or the first possible implementation to the fifth possible implementation of the fourth aspect, in a sixth possible implementation of the fourth aspect, the short range communications module is further configured to determine that a short range communications connection to the second device is broken; and the processor is further configured to determine to stop using all or some functions of the virtual subscriber identity, or determine to stop using the virtual subscriber identity.

According to a fifth aspect, a device for allocating a virtual subscriber identity is provided, and the device includes: a processor, configured to generate a virtual subscriber identity module data package, where the virtual subscriber identity module data package carries a virtual subscriber identity, and the virtual subscriber identity is used to perform communication in a network provided by a mobile communications operator; and a short range communications module, configured to send the virtual subscriber identity module data package generated by the processor to a first device by using a short range communications protocol.

With reference to the fifth aspect, in a first possible implementation of the fifth aspect, the short range communications module is further configured to: send a virtual subscriber identity module installation package to the first device by using the short range communications protocol, where the virtual subscriber identity module installation package is used to obtain an installed virtual subscriber identity module after the first device runs the virtual subscriber identity module installation package, and the virtual subscriber identity module is a software package used to process the virtual subscriber identity module data package and obtain the virtual subscriber identity.

With reference to the fifth aspect or the first possible implementation of the fifth aspect, in a second possible implementation of the fifth aspect, the device for allocating a virtual subscriber identity further includes a radio frequency unit, and the radio frequency unit is configured to: send an allocation request message to a server provided by the mobile communications operator, where the allocation request message is used to request to allocate the virtual subscriber identity; and receive the virtual subscriber identity sent by the server, or receive check information used to obtain the virtual subscriber identity and sent by the server.

With reference to the fifth aspect, or the first possible implementation or the second possible implementation of the fifth aspect, in a third possible implementation of the fifth aspect, the virtual subscriber identity module data package carries time information, and the time information is used to indicate a term of authority to use the virtual subscriber identity.

With reference to any one of the fifth aspect, or the first possible implementation to the third possible implementation of the fifth aspect, in a fourth possible implementation of the fifth aspect, the virtual subscriber identity module data package carries location information, and different location information corresponds to different authority to use the virtual subscriber identity.

With reference to any one of the fifth aspect, or the first possible implementation to the fourth possible implementation of the fifth aspect, in a fifth possible implementation of the fifth aspect, the short range communications module is further configured to determine that a short range communications connection between the first device and the second device is broken; and the processor is further configured to update the authority to use the virtual subscriber identity, so that the first device stops using all or some functions of the virtual subscriber identity or that the first device stops using the virtual subscriber identity.

According to a sixth aspect, a use authority control device is provided, and the device includes: a short range communications module, configured to communicate with a first device by using a short range communications protocol; and a processor, configured to: after determining that at least one first device communicating with the use authority control device by using the short range communications protocol obtains a virtual subscriber identity respectively, determine that a target first device satisfies a condition for updating authority to use a virtual subscriber identity; and update the authority to use the virtual subscriber identity obtained by the target first device.

With reference to the sixth aspect, in a first possible implementation of the sixth aspect, that the processor updates the authority to use the virtual subscriber identity obtained by the target first device may be implemented in the following manner: The processor forbids the target first device to use all or some functions of the obtained virtual subscriber identity; or the processor forbids the target first device to use the obtained virtual subscriber identity.

According to a seventh aspect, another device for performing communication by using a virtual subscriber identity module is provided, and the device includes a module configured to perform the method in any one of the first aspect or possible implementations of the first aspect.

According to an eighth aspect, another device for allocating a virtual subscriber identity is provided, and the device includes a module configured to perform the method in any one of the second aspect or possible implementations of the second aspect.

According to a ninth aspect, another use authority control device is provided, and the device includes a module configured to perform the method in any one of the third aspect or possible implementations of the third aspect.

In the technical solutions provided by the embodiments of the present invention, a device in which no physical SIM card is disposed can also perform communication in a network provided by a mobile operator, and the communication does not need to depend on another device used as a relay. The communication mode is quite convenient.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
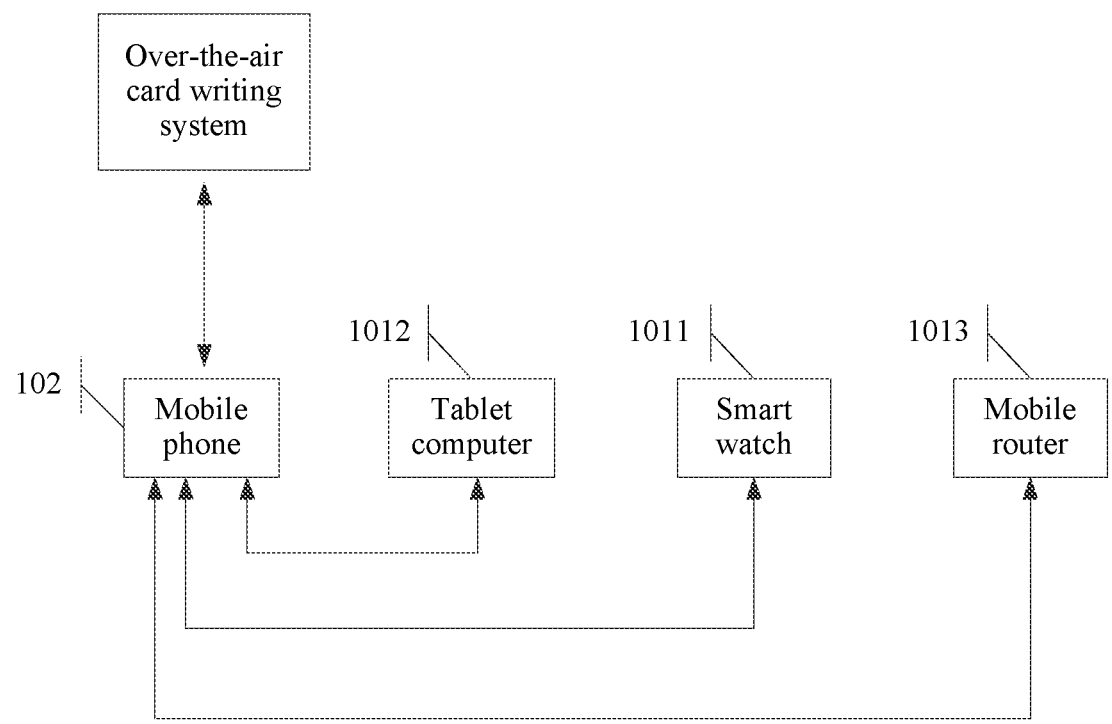
FIG. 1 is a diagram of an application scenario according to an embodiment of the present invention.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention.

Technologies described in this specification may be applied to various communications systems, for example, 3G, 4G, and a next-generation communications system, for example, a Global System for Mobile Communications (Global System for Mobile communications, GSM), a Code Division Multiple Access (Code Division Multiple Access, CDMA) system, a Time Division Multiple Access (Time Division Multiple Access, TDMA) system, a Wideband Code Division Multiple Access (Wideband Code Division Multiple Access Wireless, WCDMA) system, a Frequency Division Multiple Access (Frequency Division Multiple Addressing, FDMA) system, an Orthogonal Frequency-Division Multiple Access (Orthogonal Frequency-Division Multiple Access, OFDMA) system, a single-carrier FDMA (SC-FDMA) system, a General Packet Radio Service (General Packet Radio Service, GPRS) system, a Long Term Evolution (Long Term Evolution, LTE) system, and other communications systems.

The following explains and describes some terminologies in the embodiments of the present invention.

A terminal device may be a device that provides a user with voice and/or data connectivity, for example, may be a handheld device with a wireless connection function, or a processing device connected to a wireless modem. The terminal device may communicate with a core network by using a radio access network (Radio Access Network, RAN), and exchange voices and/or data with the RAN. The terminal device may include user equipment (User Equipment, UE), a wireless terminal device, a mobile terminal device, a subscriber unit (Subscriber Unit), a subscriber station (Subscriber Station), a mobile station (Mobile Station), a mobile console (Mobile), a remote station (Remote Station), an access point (Access Point, AP), a remote terminal device (Remote Terminal), an access terminal device (Access Terminal), a user terminal device (User Terminal), a user agent (User Agent), a user device (User Device), or the like. For example, the terminal device may include a mobile phone (or referred to as a "cellular" phone), a mobile computer, a tablet computer, a personal digital assistant (Personal Digital Assistant, PDA), a media player, a smart television, or a combination of two or more thereof.

In the embodiments of the present invention, a first device is a terminal device that can read data of a soft SIM card. A second device is configured to obtain the data of the soft SIM card from an operator. The second device may obtain the data of the soft SIM card by using an embedded eSIM module. A physical SIM card may also be inserted into the second device, and the data of the soft SIM card is obtained by using the physical SIM card. A soft SIM application may also be installed in the second device, and the data of the soft SIM card is obtained by using the soft SIM application.

Types of the first device and the second device may be the same or different. The first device may include a wearable device, for example, a smart watch, smart glasses, or smart clothes, or certainly may include a non-wearable device, for example, a tablet computer (PAD) in which no physical SIM card is disposed. The second device may include a non-wearable device, for example, a mobile phone or a PAD, or the second device may include a wearable device, for example, a smart watch, smart glasses, or smart clothes. In addition, the types of the first device and the second device may be the same or different, and are not limited in the embodiments of the present invention.

A server of a mobile communications operator may be considered as a network device, and may include a network server provided by the mobile communications operator, or may include a base station. The base station may be a device that communicates with a wireless terminal device by using one or more sectors on an air interface in an access network. The base station may be configured to perform mutual conversion between a received air frame and an Internet Protocol (IP) packet and serve as a router between the wireless terminal device and other parts of the access network. The other parts of the access network may include an IP network. The base station may further coordinate attribute management of the air interface. For example, the base station may be a radio network controller (Radio Network Controller, RNC) or a base station controller (Base Station Controller, BSC), or may be an evolved NodeB (NodeB or eNB or e-NodeB, evolved NodeB) in an LTE-advanced (LTE-Advanced, LTE-A) system. This is not limited in the embodiments of the present invention.

A short range communications protocol may include the Bluetooth (Bluetooth) protocol, the Wireless Fidelity (Wireless Fidelity, Wi-Fi) protocol, the Infrared Data Transmission (Infrared Data Association, IrDA) protocol, or the like that is widely used currently, and may further include some short range wireless communications protocols having development potentials, for example, the ZigBee (ZigBee) protocol, the Ultra Wideband (Ultra WideBand) protocol, short range communications (Near Field Communication, NFC) protocol, or the ultra wideband technology (Ultra Wideband, UWB) protocol.

A virtual subscriber identity module can identify data of a soft SIM card, and perform communication by using a virtual subscriber identity in the data of the soft SIM card. The virtual subscriber identity module may be implemented by hardware or software. For example, the virtual subscriber identity module may include a virtual subscriber identity module (virtual Subscriber Identity Module, VSIM), or may include an embedded subscriber identity module (embedded Subscriber Identity Module, eSIM), or certainly may include other possible forms. This is not limited in the embodiments of the present invention. If the virtual subscriber identity module is implemented by software, for example, represented in a form of an application (APP), the virtual subscriber identity module may be referred to as a soft SIM application. The first device may run an installation package of the soft SIM application to install the virtual subscriber identity module in the first device, and by running the soft SIM application, the first device can perform communication in a network provided by the mobile operator. If the virtual subscriber identity module is implemented by hardware, the virtual subscriber identity module may be a hardware module embedded in the first device, for example, an embedded eSIM module. Hereinafter the embedded eSIM module is referred to as an eSIM module. The form of the virtual subscriber identity module is not limited in the embodiments of the present invention. Hereinafter for ease of description, the virtual subscriber identity module may also be referred to as a virtual SIM card.

The virtual subscriber identity is a communication identity supported by the virtual subscriber identity module. A function that the virtual subscriber identity can implement in the network provided by the mobile communications operator is similar to a function of a communication identity provided by a physical SIM card. This subscriber identity is a subscriber identity supported by the virtual subscriber identity module, for example, a phone number used for communication. Therefore, this subscriber identity is referred to as a virtual subscriber identity. However, the name itself does not constitute a limitation on the feature. The virtual subscriber identity may include a card number, for example, referred to as a virtual card number, or may include other forms of identities, for example, identities such as characters or letters. This is not limited in the embodiments of the present invention. After obtaining the virtual subscriber identity, the terminal device may uniquely identify, based on the obtained virtual subscriber identity when performing communication by using the mobile network, identity information of a user using the device, and perform communication.

Terminologies "system" and "network" in the embodiments of the present invention may be interchanged in use. The terminology "plurality" denotes two or more. The terminology "and/or" describes an association relationship between associated objects and represents that three relationships may exist. For example, A and/or B may represent the following three cases: Only A exists, both A and B exist, and only B exists. In addition, the character "/" generally indicates an "or" relationship between the associated objects unless otherwise specified.

Referring to FIG. 1, first, a possible application scenario of an embodiment of the present invention is described.

FIG. 1 includes three first devices and one second device. The second device is a mobile phone 102, and a physical SIM card is disposed in the mobile phone 102. The three first devices are a smart watch 1011, a PAD 1012, and a mobile router 1013, and no physical SIM card is disposed in the three first devices. In an actual implementation, a quantity and types of first devices are not limited, and certainly, a quantity and types of second devices are not limited, either. The first device may communicate with the second device by using a short range communications protocol. The second device may communicate with an over-the-air card writing system by using a network provided by a mobile communications operator. The over-the-air card writing system may be understood as a server provided by the mobile communications operator, or may be understood as a hardware module or a software module in a server provided by the mobile communications operator.

The following briefly describes a process of communication between the mobile phone 102 and the smart watch 1011 in the second device.

A physical SIM card is disposed in the mobile phone 102, and the over-the-air card writing system may allocate, to the mobile phone 102, a communication number corresponding to the physical SIM card. The communication number of the mobile phone 102 is generally a mobile phone number, or it may be understood that a mobile phone number of the mobile phone 102 is bound with the physical SIM card in the mobile phone 102. The over-the-air card writing system may activate the mobile phone number, so that the mobile phone 102 can use the mobile phone number to perform communication in the network provided by the mobile communications operator. Currently, if the first device wants to implement communication in the network provided by the mobile communications operator, for example, if the smart watch 1011 wants to perform communication in the network provided by the mobile communications operator, because no physical SIM card is disposed in the smart watch 1011, and a communication number cannot be obtained, the smart watch 1011 generally implements communication by using the mobile phone 102. The smart watch 1011 sends to-be-sent information to the mobile phone 102, and the mobile phone 102 sends the information to a communication peer located in the network provided by the mobile communications operator. If another device wants to send information to the smart watch 1011 by using the network provided by the mobile communications operator, the another device may send the information to the mobile phone 102, and the mobile phone 102 forwards the information to the smart watch 1011.

As can be seen from above, for a device in which no physical SIM card is disposed, to implement communication in the network provided by the mobile communications operator, a device in which a physical SIM card is disposed needs to be used as a relay. This is relatively complex, and depends on the relay device excessively. In view of this, an embodiment of the present invention provides a new communication mode in the application scenario. First, a device provided by this embodiment of the present invention is described with reference to an accompanying drawing. After the device is described, the communication mode provided by this embodiment of the present invention is described with reference to the device and the application scenario shown in FIG. 1.

Figure 2:
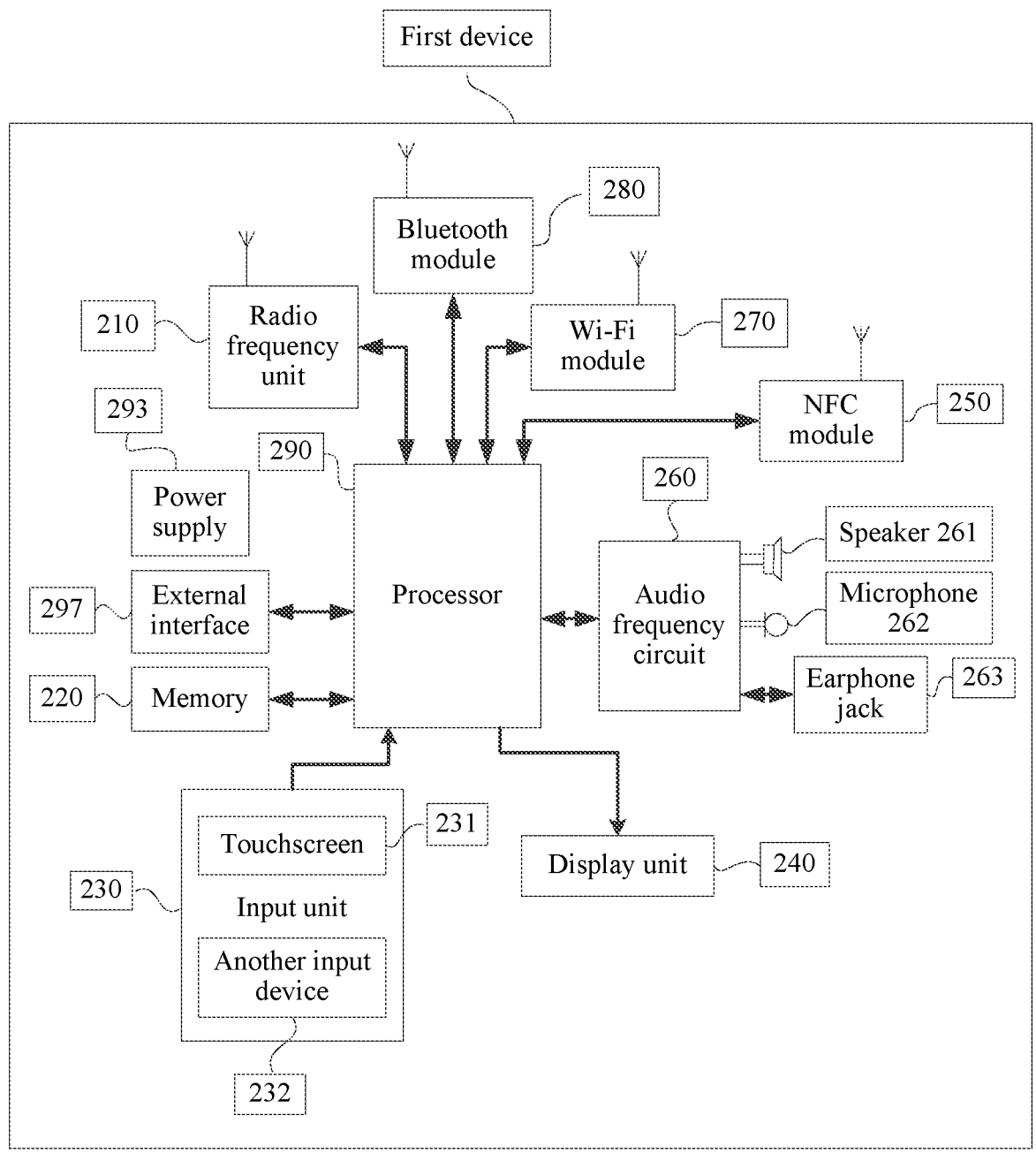
FIG. 2 is a schematic structural diagram of a device for performing communication by using a virtual subscriber identity module according to an embodiment of the present invention.

Referring to FIG. 2, an embodiment of the present invention provides a device for performing communication by using a virtual subscriber identity module. The device may be, for example, a first device.

FIG. 2 is a schematic structural diagram of a first device. The first device may include components such as a memory 220, a processor 290, a Wi-Fi module 270, a Bluetooth module 280, an NFC module 250, a radio frequency unit 210, and a power supply 293. In FIG. 2, all of the Wi-Fi module 270, the Bluetooth module 280, and the NFC module 250 are short range communications modules, and the first device may include one or more of the three modules. In an actual implementation, to implement short range communication, the first device may select any one of the Wi-Fi module 270, the Bluetooth module 280, or the NFC module 250. In addition, a person skilled in the art should know that, in addition to three short range communication modes supported by the three modules, the first device may further support other possible short range communication modes, for example, ZigBee, that is, the first device may further include other possible short range communications modules. This is not limited in this embodiment of the present invention.

Optionally, the first device may further include components such as a touchscreen 231, an input unit 230, a display unit 240, an external interface 297, an audio frequency circuit 260, a speaker 261, and a microphone 262. Naturally, the first device in this embodiment of the present invention may include none of the components, or include only some of the components.

A person skilled in the art may understand that, FIG. 2 is merely an example of the first device and does not constitute a limitation on the first device. A quantity of components included in the first device may be more or less than that shown in the figure, or some components are combined, or there are different components.

The memory 220 may be configured to store an instruction and data. The memory 220 may mainly include an instruction storage area and a data storage area. The instruction storage area may store an operating system, an instruction required by at least one function, and the like. The data storage area may store data.

The first device may include a virtual subscriber identity module. If the virtual subscriber identity module is implemented by software, the virtual subscriber identity module may be a soft SIM application. The first device may run an installation package of the soft SIM application to install the soft SIM application in the first device. After the soft SIM application is installed in the first device, data of the soft SIM application may be stored in the memory 220. If the virtual subscriber identity module is implemented by hardware, the virtual subscriber identity module may be an embedded hardware module, for example, an eSIM module, not shown in FIG. 2.

The processor 290 is a control center of the first device, and is connected to all parts of the first device by using various interfaces and lines. The processor 290 can implement various functions, and can also process data, thereby performing overall monitoring on the first device. Optionally, the processor 290 may include one or more processing units. Preferably, the processor 290 may integrate an application processor and a modem processor, where the application processor mainly processes the operating system, a user interface, an application program, and the like, and the modem processor mainly processes wireless communication. It may be understood that the modem processor may also not be integrated with the processor 290. In some embodiments, the processor 290 and the memory 220 may be implemented on a same chip, and in some embodiments, they may also be implemented separately on independent chips.

The radio frequency unit 210 may be configured to receive or transmit information or receive or transmit a signal in a call process. Generally, a radio frequency circuit included in the radio frequency unit 210 includes but is not limited to an antenna, at least one amplifier, a transceiver, a coupler, a low noise amplifier (Low Noise Amplifier, LNA), a duplexer, and the like. In addition, the radio frequency unit 210 may further communicate with a network device and another device through wireless communication. Wireless communication may be based on communications standard or protocol, including but not limited to GSM, GPRS, CDMA, WCDMA, LTE, email, short message service (Short Messaging Service, SMS), or the like.

Wi-Fi is a short range wireless transmission technology. By using the Wi-Fi module 270, the first device may help a user send and receive e-mails, browse web pages, access streaming media, and so on. Wi-Fi provides wireless broadband Internet access for the user. The first device may exchange information with a second device by using the Wi-Fi module 270.

Bluetooth is a short range wireless communications technology. Using the Bluetooth technology can effectively simplify communication between mobile communications terminal devices such as a palmtop computer, a notebook computer, and a mobile phone, and can also successfully simplify communication between the devices and the Internet (Internet). The first device may exchange information with the second device by using the Bluetooth module 280.

NFC is a short range wireless communications technology. Using NFC can simplify communication between two devices. For example, two devices can implement an NFC connection simply by touching each other, and can transmit data by using the NFC connection. For the user, this connection mode is simple, and is relatively easy to implement. The first device may exchange information with the second device by using the NFC module 250.

In this embodiment of the present invention, the short range communications module is configured to receive a virtual subscriber identity module data package sent by the second device by using a short range communications protocol, where the virtual subscriber identity module data package carries a virtual subscriber identity, and the virtual subscriber identity is used to uniquely identify the user using the device for performing communication by using a virtual subscriber identity module when the device for performing communication by using a virtual subscriber identity module performs communication in a network provided by a mobile communications operator. The processor 290 is configured to obtain the virtual subscriber identity carried in the virtual subscriber identity module data package. The radio frequency unit 210 is configured to communicate with another device by using the virtual subscriber identity in the network provided by the mobile communications operator. The virtual subscriber identity module is a software package used to process the virtual subscriber identity module data package and obtain the virtual subscriber identity.

If the virtual subscriber identity module in the first device is a soft SIM application, the processor 290 may obtain, by using the soft SIM application, the virtual subscriber identity module data package received by the short range communications module, and the processor 290 may store the virtual subscriber identity module data package in the memory 220. Alternatively, the virtual subscriber identity module data package may be stored in a cache or a register of the processor 290. This is not limited in this embodiment of the present invention. In addition, the processor 290 may parse the virtual subscriber identity module data package by using the soft SIM application, to obtain the virtual subscriber identity or check information carried in the virtual subscriber identity module data package.

If the virtual subscriber identity module is an eSIM module, the first device may obtain, by using the eSIM module, the virtual subscriber identity module data package received by the short range communications module. After the eSIM module obtains the virtual subscriber identity module data package, the eSIM module may store the virtual subscriber identity module data package in the eSIM module, or may store the virtual subscriber identity module data package in the memory 220. The eSIM module may identify the virtual subscriber identity in the virtual subscriber identity module data package to perform communication.

The first device may further parse the virtual subscriber identity module data package by using an installed APP corresponding to the eSIM module, to obtain the virtual subscriber identity or the check information carried in the virtual subscriber identity module data package. The APP corresponding to the eSIM module may also be referred to as a soft SIM application.

The input unit 230 may be configured to receive input digit or character information, and generate a key signal input related to a user setting and function control of the first device. For example, the input unit 230 may include a touchscreen 231 and another input device 232. The touchscreen 231 may capture a touch operation of the user on or near the touchscreen (for example, an operation performed by the user by using any appropriate object such as a finger, a finger joint, or a stylus on the touchscreen 231 or near the touchscreen 231), and drive a corresponding connection apparatus according to a preset program. The touchscreen 231 may detect the touch operation of the user on the touchscreen 231, convert the touch operation into a touch signal, and send the touch signal to the processor 290, or understandably, may send touch information of the touch operation to the processor 290, and can receive a command from the processor 290 and execute the command. The touchscreen 231 may provide an input interface and an output interface between the first device and the user. In addition, the touchscreen 231 may be implemented by using multiple types such as resistive, capacitive, infrared, and surface acoustic wave. In addition to the touchscreen 231, the input unit 230 may further include the another input device. For example, the another input device 232 may include but is not limited to one or more of a physical keyboard, a function key (such as a volume control key 232 or a power on/off key 233), a trackball, a mouse, a joystick, or the like.

The display unit 240 may be configured to display information input by the user or information provided for the user and various menus of the first device. Further, the touchscreen 231 may cover the display unit 240. When the touchscreen 231 detects the touch operation on or near the touchscreen, the touchscreen 231 transmits the touch operation to the processor 290 to determine a type of a touch event. Then the processor 290 provides a corresponding visual output on the display unit 240 according to the type of the touch event. In this embodiment, the touchscreen 231 and the display unit 240 may be integrated into one component to implement input, output, and display functions of the first device. For ease of description, in this embodiment of the present invention, for example, the touchscreen 231 represents a function set of the touchscreen 231 and the display unit 240. Certainly, in some embodiments, the touchscreen 231 and the display unit 240 may also be used as two independent components.

Optional components such as the audio frequency circuit 260, the speaker 261, and the microphone 262 may provide an audio interface between the user and the first device. The audio frequency circuit 260 may transmit a received electrical signal converted from audio data to the speaker 261, and the speaker 561 converts the electrical signal into an audio signal for outputting. In addition, the microphone 262 converts a captured audio signal into an electrical signal, and the audio frequency circuit 260 receives the electrical signal and converts the electrical signal into audio data. After the audio data is output to the processor 290 for processing, the audio data is sent by the radio frequency unit 210 to another device, or the audio data is output to the memory 220 for further processing. The audio frequency circuit may also include an earphone jack 263, configured to provide a connection interface between the audio frequency circuit and an earphone.

The first device may further include the power supply 293 such as a battery supplying power to each component. Preferably, the power supply 293 may be logically connected to the processor 290 by using a power management system, so as to implement functions such as charge and discharge management and power consumption management by using the power management system.

The first device may further include the external interface 297. The external interface may include a standard micro universal serial bus (Universal Serial Bus, Micro USB) interface, or may include a multi-pin connector, and may be configured to connect the first device to another device to perform communication, or may be configured to connect to a battery charger to charge the first device.

In addition, although not illustrated, the first device may further include other possible functional modules such as a camera, a camera flash, and various sensors. Details are not described again herein.

In this embodiment of the present invention, because the first device can perform communication by using the virtual subscriber identity, a virtual SIM card may be installed in the first device, and the virtual SIM card may be a software module. Therefore, no physical SIM card needs to be disposed in the first device, and a slot for placing a physical SIM card in the first device may not be required, either. This helps save space in the first device.

Figure 3:
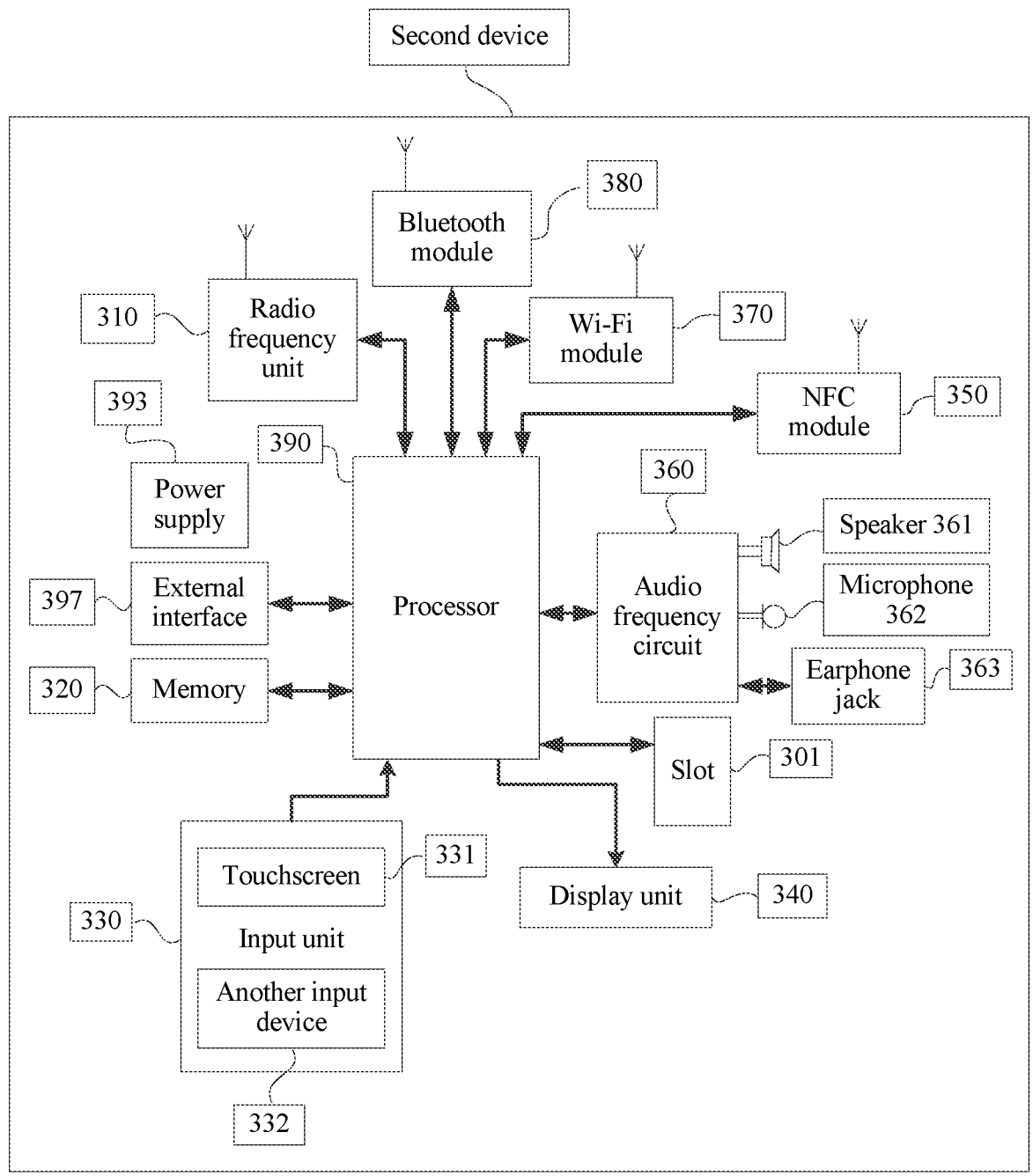
FIG. 3 is a schematic structural diagram of a device for allocating a virtual subscriber identity according to an embodiment of the present invention.

Referring to FIG. 3, an embodiment of the present invention provides a device for allocating a virtual subscriber identity. The device may be, for example, a second device.

FIG. 3 is a schematic structural diagram of a second device. The second device may include components such as a memory 320, a processor 390, a Wi-Fi (Wireless Fidelity, Wireless Fidelity) module 370, a Bluetooth module 380, an NFC module 350, and a power supply 393. A physical SIM card may be disposed in the second device. In this case, the second device may further include a slot 301 for placing the physical SIM card. In FIG. 3, for example, the second device includes the slot 301, and the physical SIM card may be inserted in the slot 301. In an actual implementation, alternatively, no physical SIM card may be disposed in the second device. For example, a virtual subscriber identity module in a software form or a virtual subscriber identity module in a hardware form may also be disposed in the second device. If the virtual subscriber identity module is represented in a form of a soft SIM application, the second device may run an installation package of the soft SIM application to install the soft SIM application in the second device. After the soft SIM application is installed in the first device, information of the soft SIM application may be stored in the memory 320. Alternatively, the virtual subscriber identity module in the second device is represented in the hardware form. In this case, the virtual subscriber identity module may be a hardware module embedded in the second device, for example, an eSIM module, not shown in FIG. 3.

In FIG. 3, all of the Wi-Fi module 370, the Bluetooth module 380, and the NFC module 350 are short range communications modules, and the second device may include one or more of the three modules. In an actual implementation, to implement short range communication, the second device may select any one of the Wi-Fi module 370, the Bluetooth module 380, or the NFC module 350 for implementation. In addition, a person skilled in the art should know that, in addition to three short range communication modes supported by the three modules, the second device may further support other possible short range communication modes, that is, the second device may further include other possible short range communications modules. This is not limited in this embodiment of the present invention. Certainly, both the second device and a first device need to support at least one short range communication mode, that is, the second device and the first device need to include at least one short range communications module of a same type. For example, the two devices may both include a Bluetooth module, or may both include an NFC module, or the like, so that the second device can communicate with the first device by using a short range communications protocol.

Optionally, the second device may further include a radio frequency unit 310.

Optionally, the second device may further include components such as a touchscreen 331, an input unit 330, a display unit 340, an external interface 397, an audio frequency circuit 360, a speaker 361, and a microphone 362. Naturally, the second device in this embodiment of the present invention may also not include all or some of the components.

A person skilled in the art may understand that, FIG. 3 is merely an example of the second device and does not constitute a limitation on the second device. A quantity of components included in the second device may be more or less than that shown in the figure, or some components are combined, or there are different components.

The memory 320 may be configured to store an instruction and data. The memory 320 may mainly include an instruction storage area and a data storage area. The instruction storage area may store an operating system, an instruction required by at least one function, and the like. The data storage area may be used to store data.

The processor 390 is a control center of the second device, and is connected to all parts of the second device by using various interfaces and lines. The processor 390 can implement various functions, and can also process data, thereby performing overall monitoring on the second device. Optionally, the processor 390 may include one or more processing units. Preferably, the processor 390 may integrate an application processor and a modem processor, where the application processor mainly processes the operating system, a user interface, an application program, and the like, and the modem processor mainly processes wireless communication. It may be understood that the modem processor may also not be integrated with the processor 390. In some embodiments, the processor 390 and the memory 320 may be implemented on a same chip, and in some embodiments, they may also be implemented separately on independent chips.

The second device may exchange information with the first device by using the Wi-Fi module 370, the NFC module 350, or the Bluetooth module 380.

In this embodiment of the present invention, the processor 390 may generate a virtual subscriber identity module data package, where the virtual subscriber identity module data package carries a virtual subscriber identity, and the virtual subscriber identity is used to perform communication in a network provided by a mobile communications operator. The short range communications module is configured to interact with the first device by using the short range communications protocol, and send the virtual subscriber identity module data package generated by the processor 390 to the first device.

If a physical SIM card is disposed in the second device, an APP corresponding to the physical SIM card may be installed in the second device. In this case, the processor 390 may generate a virtual subscriber identity module data package by using the APP; and the physical SIM card obtains the virtual subscriber identity module data package generated by the APP, and then sends the virtual subscriber identity module data package by using the short range communications module.

If a virtual subscriber identity module is disposed in the second device, and the virtual subscriber identity module is a soft SIM application, the processor 390 may generate a virtual subscriber identity module data package by using the soft SIM application, and then send the virtual subscriber identity module data package by using the short range communications module.

If a virtual subscriber identity module is disposed in the second device, and the virtual subscriber identity module is an eSIM module, a soft SIM application corresponding to the eSIM module may be further installed in the second device; the processor 390 may generate a virtual subscriber identity module data package by using the soft SIM application; and the eSIM module obtains the virtual subscriber identity module data package generated by the soft SIM application, and then sends the virtual subscriber identity module data package by using the short range communications module.

The input unit 330 may be configured to receive input digit or character information, and generate a key signal input related to a user setting and function control of the second device. For example, the input unit 330 may include a touchscreen 331 and another input device 332. The touchscreen 331 may capture a touch operation of a user on or near the touchscreen (for example, an operation performed by the user by using any appropriate object such as a finger, a finger joint, or a stylus on the touchscreen 331 or near the touchscreen 331), and drive a corresponding connection apparatus according to a preset program. The touchscreen 331 may detect the touch operation of the user on the touchscreen 331, convert the touch operation into a touch signal, and send the touch signal to the processor 390, or understandably may send touch information of the touch operation to the processor 390, and can receive a command from the processor 390 and execute the command. The touchscreen 331 may provide an input interface and an output interface between the second device and the user. In addition, the touchscreen 331 may be implemented by using multiple types such as resistive, capacitive, infrared, and surface acoustic wave. In addition to the touchscreen 331, the input unit 330 may further include the another input device. For example, the another input device 332 may include but is not limited to one or more of a physical keyboard, a function key (such as a volume control key 332 or a power on/off key 333), a trackball, a mouse, a joystick, or the like.

The display unit 340 may be configured to display information input by the user or information provided for the user and various menus of the second device. Further, the touchscreen 331 may cover the display unit 340. When the touchscreen 331 detects the touch operation on or near the touchscreen, the touchscreen 331 transmits the touch operation to the processor 390 to determine a type of a touch event. Then the processor 390 provides a corresponding visual output on the display unit 340 according to the type of the touch event. In this embodiment, the touchscreen 331 and the display unit 340 may be integrated into one component to implement input, output, and display functions of the second device. For ease of description, in this embodiment of the present invention, for example, the touchscreen 331 represents a function set of the touchscreen 331 and the display unit 340. Certainly, in some embodiments, the touchscreen 331 and the display unit 340 may also be used as two independent components.

Optional components such as the audio frequency circuit 360, the speaker 361, and the microphone 362 may provide an audio interface between the user and the second device. The audio frequency circuit 360 may transmit a received electrical signal converted from audio data to the speaker 361, and the speaker 361 converts the electrical signal into an audio signal for outputting. On the other hand, the microphone 362 converts a captured audio signal into an electrical signal, and the audio frequency circuit 360 receives the electrical signal and converts the electrical signal into audio data. After the audio data is output to the processor 390 for processing, the audio data is sent by the radio frequency unit 310 to another device, or the audio data is output to the memory 320 for further processing. The audio frequency circuit may also include an earphone jack 363, configured to provide a connection interface between the audio frequency circuit and an earphone.

The second device may further include the power supply 393 such as a battery supplying power to each component. Preferably, the power supply 393 may be logically connected to the processor 390 by using a power management system, so as to implement functions such as charge and discharge management and power consumption management by using the power management system.

The second device may further include the external interface 397. The external interface may include a standard micro universal serial bus (Universal Serial Bus, Micro USB) interface, or may include a multi-pin connector, and may be configured to connect the second device to another device to perform communication, or may be configured to connect to a battery charger to charge the second device.

In addition, although not illustrated, the second device may further include other possible functional modules such as a camera, a camera flash, and various sensors. Details are not described again herein.

An embodiment of the present invention further provides a use authority control device. For a structure of the device, continue to refer to FIG. 3. In this embodiment of the present invention, the use authority control device and a device for allocating a virtual subscriber identity may be a same device, for example, a second device. Certainly, the use authority control device and a device for allocating a virtual subscriber identity may be also different devices.

In this embodiment of the present invention, a processor 390 of the use authority control device may implement the following functions: after determining that at least one first device communicating with the use authority control device by using a short range communications protocol obtains a virtual subscriber identity respectively, determining that a target first device satisfies a condition for updating authority to use a virtual subscriber identity; and updating the authority to use the virtual subscriber identity obtained by the target first device.

With reference to the devices, the following describes communication modes provided by the embodiments of the present invention. In the embodiments described hereinafter, the application scenario shown in FIG. 1 is used as an example for detailed description. In the following embodiments, for a structure of a first device, refer to the embodiment shown in FIG. 2; and for a structure of a second device, refer to the embodiment shown in FIG. 3. In addition, in the following example, the second device is a mobile phone 102, a number of a physical SIM card disposed in the mobile phone 102 is a number A, and a virtual subscriber identity is a virtual card number. Certainly, this is not limited in an actual implementation.

Figure 4:
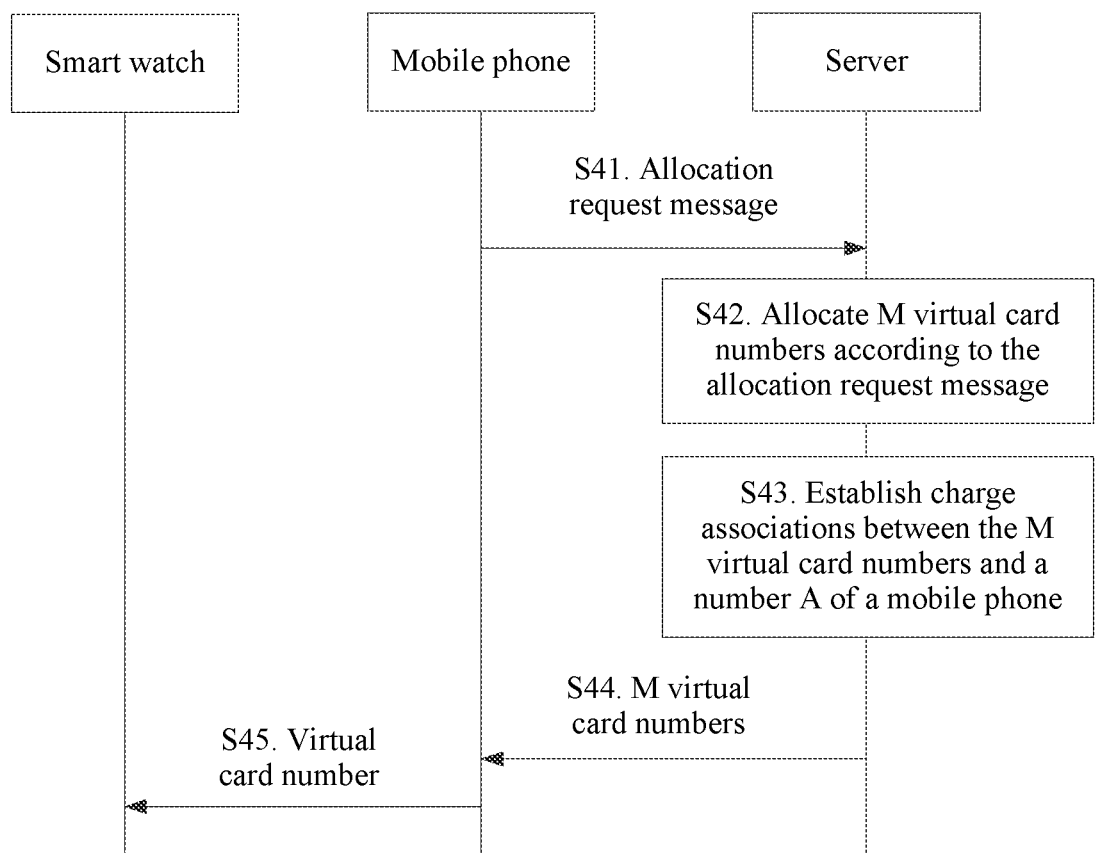
FIG. 4 is a flowchart of a method for allocating a virtual card number to a first device according to an embodiment of the present invention.

Referring to FIG. 4, FIG. 4 is an embodiment of a method for allocating a virtual card number according to an embodiment of the present invention. How to allocate a virtual card number and how to perform communication by using a virtual subscriber identity module are described in this embodiment.

S41. A radio frequency unit 310 of a mobile phone 102 sends, by using a number A, an allocation request message to a server provided by a mobile communications operator, where the allocation request message may be used to request to register and subscribe to a virtual subscriber identity module service. The allocation request message may carry the number A of the mobile phone 102.

The virtual subscriber identity module service may also be referred to as a virtual SIM card service, and is a service customized in this embodiment of the present invention. After the mobile phone 102 subscribes to the virtual SIM card service, the server provided by the mobile communications operator may allocate at least one virtual card number according to the number A, where a quantity of allocated virtual card numbers may be requested when the mobile phone 102 registers and subscribes to the virtual SIM card service from the server, or may be determined by the server itself. In this case, it may also be considered that the allocation request message is further used to request to allocate a virtual card number. The virtual card number corresponds to the number A, and may indicate that a charge generated by the virtual card number during communication in a network provided by the mobile communications operator will be counted into a charge of the number A.

Each virtual card number allocated by the server according to the number A may be different. In this way, the mobile phone 102 may allocate, to at least one first device, the at least one virtual card number allocated by the server, so that when the at least one first device has no physical SIM card, the at least one first device can perform communication in the network provided by the mobile communications operator. The virtual card number allocated to the at least one first device is different from each other, and no conflict occurs.

S42. After the server receives the allocation request message that is used to register and subscribe to the virtual SIM card service and sent by the radio frequency unit 310 of the mobile phone 102 by using the number A, the server may determine whether to allow the mobile phone 102 to subscribe to the virtual SIM card service. If the server determines to allow the mobile phone 102 to subscribe to the virtual SIM card service, the server may allocate M virtual card numbers according to the number A carried in the allocation request message, where M is a positive integer.

A determining manner is provided for the server to determine whether to allow the mobile phone 102 to subscribe to the virtual SIM card service. Details are as follows:

For ease of management, the server may preset devices allowed to subscribe to the virtual SIM card service, and may store identity information and communication identities of the devices. The communication identities may be communication numbers. After receiving the allocation request message sent by the mobile phone 102, the server may determine, by querying, whether the number A is a communication number of a device allowed by the server to subscribe to the virtual SIM card service; and if determining that the number A is the communication number of the device allowed by the server to subscribe to the virtual SIM card service, the server determines to allow the mobile phone 102 to subscribe to the virtual SIM card service; or if determining that the number A is not the communication number of the device allowed by the server to subscribe to the virtual SIM card service, the server determines not to allow the mobile phone 102 to subscribe to the virtual SIM card service. Certainly, in addition to the foregoing determining manner, the server may determine, in other manners, whether to allow the mobile phone 102 to subscribe to the virtual SIM card service. This is not limited in this embodiment of the present invention.

The server may obtain the number A and identity information of the mobile phone 102 by using the allocation request message. For example, the identity information of the mobile phone 102 may include an international mobile equipment identity (International Mobile Equipment Identity, IMEI), or may include a Media Access Control (Media Access Control, MAC) address of the mobile phone 102. In a word, the identity information of the mobile phone 102 may be used to uniquely identify the mobile phone 102. A purpose of obtaining the identity information of the mobile phone 102 by the server is to bind the mobile phone 102 with the number A of the mobile phone 102, so as to identify the mobile phone 102 by using the number A.

S43. The server may establish charge associations between all M allocated virtual card numbers and the number A.

Establishing a charge association may mean that a charge generated by a virtual card number allocated to the number A is counted into the charge of the number A, that is, the charge is borne by the number A, or borne by an account or a user corresponding to the number A. In this case, when the first device performs communication by using the M virtual card numbers in the network provided by the mobile communications operator, a charging system provided by the mobile communications operator counts charges generated by the virtual card numbers during communication in the network provided by the mobile communications operator into the charge of the number A.

Step S43 may also not be performed, and step S44 is performed directly after step S42 is performed. If step S43 is performed, the server may directly establish the charge associations between the M virtual card numbers and the number A after allocating the M virtual card numbers, and subsequently the mobile phone 102 does not need to request the server to establish the charge associations between the M virtual card numbers and the number A. This reduces an interaction process between devices.

S44. The server may send a data package carrying the M virtual card numbers to the mobile phone 102, that is, send the allocated M virtual card numbers to the mobile phone 102. In this case, a processor 390 of the mobile phone 102 may determine that the virtual SIM card service is subscribed to successfully, and may obtain the M virtual card numbers.

In this embodiment of the present invention, the server allows the mobile phone 102 to subscribe to the virtual SIM card service. In this case, the server may send a response message for the allocation request message to the mobile phone 102, where the response message may be used to indicate that the mobile phone 102 subscribes to the virtual SIM card service successfully. The mobile phone 102 receives the response message for the allocation request message by using the radio frequency unit 310. In another alternative solution, the server allows the mobile phone 102 to subscribe to the virtual SIM card service, and the server further allocates the M virtual card numbers according to the number A of the mobile phone. In this case, the server may send a response message for the allocation request message to the mobile phone 102, where the response message may carry the M virtual card numbers. In this case, the response message may be implemented by a data package carrying M virtual subscriber identities, and the mobile phone 102 receives the response message for the allocation request message by using the radio frequency unit 310. If a physical SIM card is disposed in the mobile phone 102, the mobile phone 102 obtains the response message for the allocation request message by using the physical SIM card. The mobile phone 102 may store the response message for the allocation request message in the physical SIM card or a memory 320. The mobile phone 102 parses the response message for the allocation request message by using an installed APP corresponding to the physical SIM card, and therefore can know that the virtual SIM card service is subscribed to successfully. If the response message for the allocation request message further carries the M virtual card numbers, the mobile phone 102 obtains the M virtual card numbers by using the installed APP corresponding to the physical SIM card. If a virtual SIM card is disposed in the mobile phone 102, and the virtual SIM card is a soft SIM application, the mobile phone 102 obtains the response message for the allocation request message by using the soft SIM application, and may store the response message for the allocation request message in the memory 320 and parse the response message for the allocation request message by using the soft SIM application, and therefore can know that the virtual SIM card service is subscribed to successfully. If the response message for the allocation request message further carries the M virtual card numbers, the mobile phone 102 obtains the M virtual card numbers by using the soft SIM application. If a virtual SIM card is disposed in the mobile phone 102, and the virtual SIM card is an eSIM module, the mobile phone 102 obtains the response message for the allocation request message by using the eSIM module, and may store the response message for the allocation request message in the eSIM module or the memory 320, and then parse the response message for the allocation request message by using an installed soft SIM application corresponding to the eSIM module, and therefore can know that the virtual SIM card service is subscribed to successfully. If the response message for the allocation request message further carries the M virtual card numbers, the mobile phone 102 obtains the M virtual card numbers by using the installed soft SIM application corresponding to the eSIM module. If the server does not allow the mobile phone 102 to subscribe to the virtual SIM card service, the server may send a response message for the allocation request message to the mobile phone 102, where the response message may be used to indicate that the mobile phone 102 fails to subscribe to the virtual SIM card service. In this case, the server does not allocate a virtual card number.

If step S43 is performed, the foregoing step S43 and step S44 may be performed simultaneously, or step S43 is performed before step S44, or step S44 is performed before step S43.

S45. After the mobile phone 102 subscribes to the virtual SIM card service successfully, when a virtual SIM card function of the mobile phone 102 is enabled, the mobile phone 102 may send the M virtual card numbers to M first devices by using a short range communications module and using a short range communications protocol. In this embodiment of the present invention, one smart watch 1011 serving as a first device is used as an example. Alternatively, the mobile phone 102 may allocate only some of the M virtual card numbers to first devices, where each virtual card number is allocated to one first device. In this embodiment of the present invention, a virtual SIM card data package sent by the mobile phone 102 to the first device may carry a virtual card number.

A virtual SIM card needs to be installed in advance in the first device that receives, by using a short range communications module, the virtual card number sent by the mobile phone 102. In this way, the first device can obtain the virtual card number from the virtual SIM card data package by using the installed virtual SIM card, and can perform communication by using a radio frequency unit 210 by using the virtual card number in the network provided by the mobile communications operator. For how the first device obtains the virtual card number from the virtual SIM card data package by using the installed virtual SIM card, refer to related descriptions in the embodiment shown in FIG. 2. Details are not described again. Naturally, a type of the virtual card number received by the first device needs to match a type of a virtual SIM card installed in the smart watch 1011. For example, if the virtual SIM card installed in the smart watch 1011 is a VSIM, the virtual card number should be a card number supported by the VSIM.

After the smart watch 1011 obtains the virtual card number, if the virtual card number is activated, the smart watch 1011 can directly communicate with another device by using a radio frequency unit 210 and using the virtual card number in the network provided by the mobile communications operator. However, if the virtual card number is not activated, the smart watch 1011 may send an activation request to the mobile phone 101 by using a short range communications module of the smart watch 1011, or the smart watch 1011 may directly send an activation request by using the network to the server provided by the mobile communications operator, to request to activate the virtual card number. If the smart watch 1011 directly sends the activation request to the server, the server may directly activate the virtual card number obtained by the smart watch 1011. If the smart watch 1011 sends the activation request to the mobile phone 102, the mobile phone 102 may forward the activation request to the server by using the radio frequency unit 310, and the server activates the virtual card number obtained by the smart watch 1011. After activating the virtual card number, the server may notify the mobile phone 102, and the mobile phone 102 notifies the smart watch 1011 by using the short range communications module of the mobile phone 102, or the server may directly notify the smart watch 1011 by using the network. In this case, the smart watch 1011 can perform communication by using the radio frequency unit 210 by using the virtual card number in the network provided by the mobile communications operator.

The server may also directly activate all or some of the virtual card numbers after allocating the M virtual card numbers. In this way, subsequently the first device or the second device does not need to further request activation. This reduces an operation process and facilitates fast communication of the first device in the network provided by the mobile communications operator. However, in this manner, security may be poor. The first device subsequently requests activation again, and the server may determine, after verifying the first device, whether to activate the virtual card number obtained by the first device. In this manner, security of the device is higher.

In an implementation, the virtual SIM card function may be set in the mobile phone 102. The user may determine whether to enable the virtual SIM card function. The user may also enable the virtual SIM card function in different manners. For example, the user may enable the virtual SIM card function in system settings of the mobile phone 102 by using an input unit 330. Alternatively, an application (APP) used to implement the virtual SIM card function may be installed in the mobile phone 102, and if the user taps an icon of the APP on a touchscreen 331 of the mobile phone 102 to invoke the APP, the virtual SIM card function is enabled when the APP is invoked. Alternatively, the user may interact with a touchscreen 331 of the mobile phone 102, and by using any browser installed in the mobile phone 102, open a web page corresponding to the virtual SIM card function.

In an implementation, the user using the mobile phone 102 may determine whether to allocate a virtual card number to a first device. For example, the user may determine whether to allocate a virtual card number to a first device, and may further select first devices to which virtual card numbers are to be allocated. Alternatively, in another implementation, whether to allocate a virtual card number to a first device may be determined according to other factors. For example, as long as a first device is successfully paired with the mobile phone 102 by using the short range communications protocol, the mobile phone 102 may actively allocate a virtual card number to the first device 102 that is paired successfully.

The following uses an example to describe how the mobile phone 102 determines whether to allocate a virtual card number to a first device. For example, a first device is a smart watch 1011, and the smart watch 1011 is successfully paired with the mobile phone 102 by using a short range communications protocol. In this case, the mobile phone 102 may obtain capability information of the smart watch 1011 by using the short range communications module of the mobile phone 102. The capability information of the first device may include at least one of a communication capability (for example, whether a module having a communication function exists) or a voice capability, and certainly may further include other possible capability information. If the capability information of the smart watch 1011 satisfies a preset condition, and the smart watch 1011 and the mobile phone 102 are in a connected state, the processor 390 of the mobile phone 102 may actively allocate a virtual card number to the smart watch 1011. The preset condition may include, for example, that the smart watch 1011 has the communication capability and/or the voice capability.

In an implementation, when the mobile phone 102 allocates the virtual card number to the first device by using the short range communications protocol, allocation may be performed in an encryption manner to improve data security. For example, if the mobile phone 102 wants to send a virtual SIM card data package to the smart watch 1011 by using the short range communications module of the mobile phone 102, the processor 390 of the mobile phone 102 may encrypt the virtual SIM card data package, and then send the encrypted virtual SIM card data package to the smart watch 1011 by using the short range communications module of the mobile phone 102. The smart watch 1011 receives the encrypted data package by using a short range communications module of the smart watch 1011, and then decrypts the encrypted data package by using a processor 290, to obtain the virtual SIM card data package, and then may obtain the virtual card number by using the virtual SIM card data package.

In this implementation, a common encryption security algorithm, for example, includes an A3 algorithm (A3 Algorithm). The A3 algorithm is generally an algorithm used to perform encryption on GSM cellular communication. The common encryption security algorithm may further include an A3/A8 algorithm. The A3/A8 algorithm includes two algorithms, namely, the A3 algorithm and an A8 algorithm, and is an algorithm used to perform encryption on GSM cellular communication. Because the A3 algorithm and the A8 algorithm are generally performed simultaneously, they are generally referred to as the A3/A8 algorithm. The A3/A8 algorithm is generally performed in a SIM card and a GSM network authentication center. In addition, the encryption security algorithm may further include an A5 algorithm (A5 Algorithm). The A5 algorithm is generally used to perform encryption on GSM cellular communication. For example, the A5 encryption algorithm is generally used to scramble user voice and data transmission between an earphone of a terminal device and a base station to enhance privacy protection. Therefore, the A5 algorithm is generally performed in an earphone and a base station subsystem (BSS). Certainly, the foregoing several algorithms are merely examples. When the second device sends the virtual SIM card data package to the first device, encryption may be performed by using other possible encryption algorithms.

For any first device, after receiving a virtual SIM card data package, the first device may invoke, by using a processor 290, a virtual SIM card installed in a memory 220 to obtain a virtual card number from the virtual SIM card data package, and therefore can perform communication by using a radio frequency unit 210 and using the virtual card number in the network provided by the mobile communications operator. A charge generated by the virtual card number during communication in the network provided by the mobile communications operator will be counted into the charge of the number A of the mobile phone 102.

Figure 5:
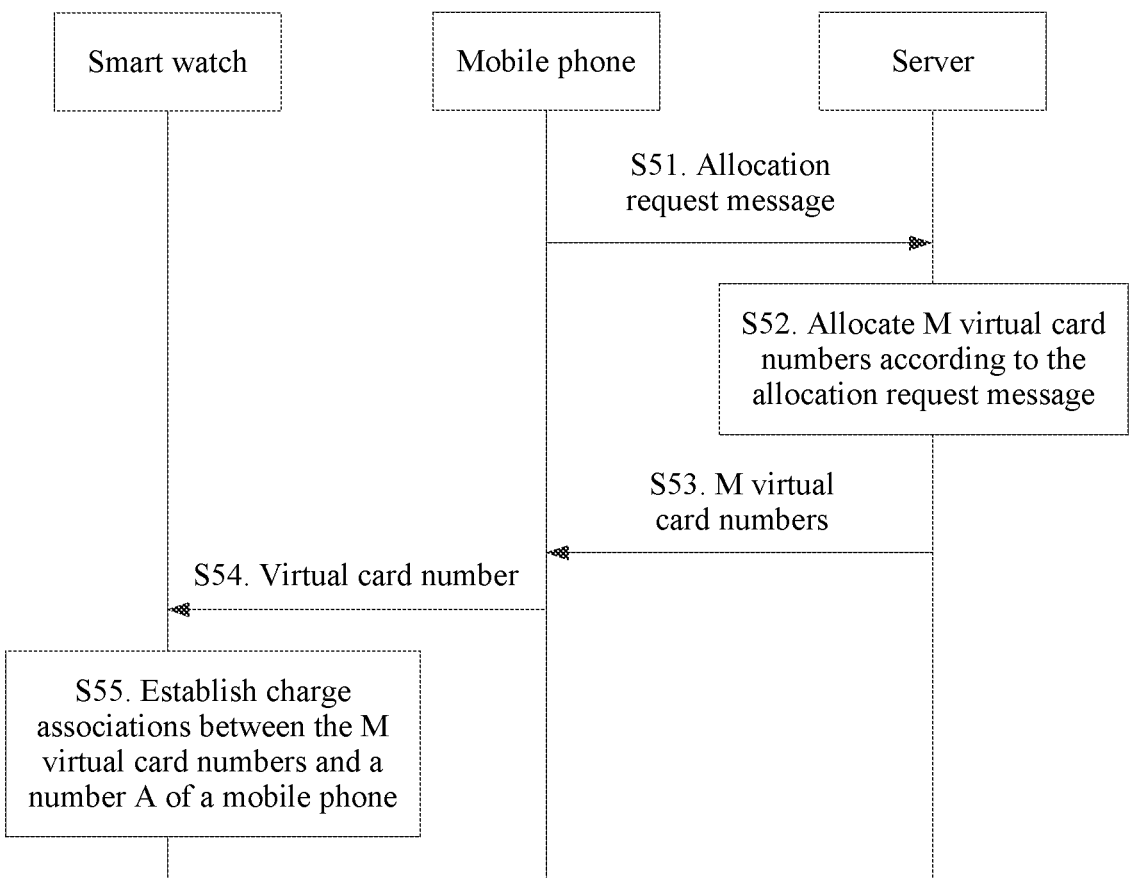
FIG. 5 is a flowchart of a method for allocating a virtual card number to a first device according to an embodiment of the present invention.

Referring to FIG. 5, an embodiment of the present invention provides an embodiment of a method for allocating a virtual card number. In this embodiment of the present invention, an alternative solution of step S43 in the embodiment shown in FIG. 4 is described.

S51. A mobile phone 102 sends, by using a radio frequency unit 310 and using a number A, an allocation request message to a server provided by a mobile communications operator, where the allocation request message may be used to request to register and subscribe to a virtual SIM card service. The allocation request message may carry the number A of the mobile phone 102.

S52. After the server receives the allocation request message that is used to register and subscribe to the virtual SIM card service and sent by the mobile phone 102 by using the number A, the server may determine whether to allow the mobile phone 102 to subscribe to the virtual SIM card service. If the server determines to allow the mobile phone 102 to subscribe to the virtual SIM card service, the server may allocate M virtual card numbers according to the number A carried in the allocation request message, where M is a positive integer.

S53. The server may send the M allocated virtual card numbers to the mobile phone 102, and the mobile phone 102 may determine that the virtual SIM card service is subscribed to successfully.

S54. After the mobile phone 102 subscribes to the virtual SIM card service successfully, when a virtual SIM card function of the mobile phone 102 is enabled, the mobile phone 102 may send the M virtual card numbers to M first devices by using a short range communications module of the mobile phone 102 and using a short range communications protocol. Alternatively, the mobile phone 102 may allocate only some of the M virtual card numbers to first devices, where each virtual card number is allocated to one first device. In this embodiment of the present invention, a virtual SIM card data package sent by the second device to the first device may carry a virtual card number.

S55. The mobile phone 102 establishes charge associations between all the M allocated virtual card numbers and the number A.

Herein that the mobile phone 102 may establish charge associations between all the M allocated virtual card numbers and the number A may be implemented in the following manner: The mobile phone 102 may send, to the server by using the radio frequency unit 310, virtual card numbers for which associations need to be established, requesting the server to establish the charge associations for the virtual card numbers and the number A. After the server establishes the charge associations, the server may return an acknowledgement message to the mobile phone. In this case, a processor 390 of the mobile phone 102 may determine that the charge associations have been established for the virtual card numbers and the number A. The virtual card numbers for which associations need to be established may be all the M virtual card numbers received by the mobile phone 102, or may be some of the M virtual card numbers. For example, the virtual card numbers may be selected randomly by the mobile phone 102, or may be selected by a user using the mobile phone 102. That is, in the embodiment shown in FIG. 4, the server selects the virtual card numbers to establish charge associations with the number A. The server may make a selection according to network conditions. In this embodiment of the present invention, the mobile phone 102 selects the virtual card numbers to establish charge associations with the number A. This is more flexible for the user.

In this embodiment of the present invention, step S54 and step S55 may be performed simultaneously, or step S54 is performed before step S55, or step S55 is performed before step S54.

Figure 6:
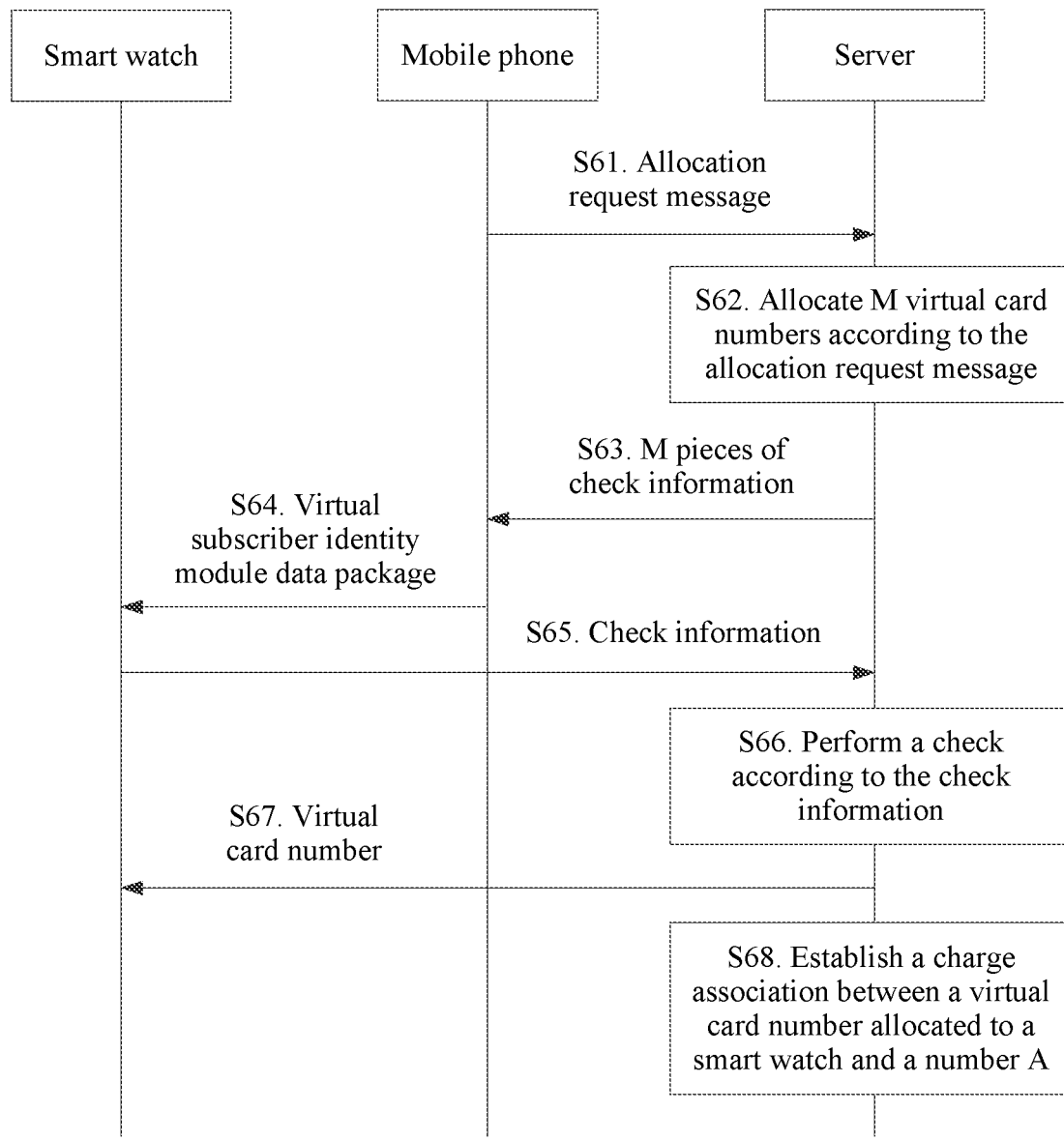
FIG. 6 is a flowchart of a method for allocating a virtual card number to a first device according to an embodiment of the present invention.

Referring to FIG. 6, an embodiment of the present invention provides an embodiment of a method for allocating a virtual card number. In this embodiment of the present invention, an alternative solution of step S44 in the embodiment shown in FIG. 4 is described, that is, another manner of sending a virtual card number by the server to the mobile phone 102 is described. In this embodiment of the present invention, the server may not directly send the virtual card number to the mobile phone 102, but sends check information used to obtain the virtual card number to the mobile phone 102. This can further enhance security.

S61. A user sends an allocation request message by using a radio frequency unit 310 and a number A on a mobile phone 102 to a server provided by a mobile communications operator, where the allocation request message may be used to request to register and subscribe to a virtual SIM card service, or it may be considered that the allocation request message may be further used to request to allocate a virtual card number.

S62. After the server receives the allocation request message that is used to register and subscribe to the virtual SIM card service and sent by the mobile phone 102 by using the number A, the server may allocate M virtual card numbers to the number A, where M is a positive integer.

S63. The server sends a response message for the allocation request message to a device to which the number A belongs, namely, the mobile phone 102, where the response message may carry M pieces of check information used to obtain the virtual card numbers, and the server may store the M virtual card numbers. In this case, the mobile phone 102 receives the response message by using the radio frequency unit 310, and the mobile phone 102 may obtain, by using the response message, the M pieces of check information used to obtain the virtual card numbers. Optionally, the server may store the M virtual card numbers according to a correspondence between the M virtual card numbers and the number A. Certainly, the M virtual card numbers may correspond to identity information of the mobile phone 102 in addition to the number A.

In the foregoing embodiment, the server directly sends a virtual card number to the mobile phone 102. However, in this embodiment of the present invention, the server sends the check information used to obtain the virtual card numbers to the mobile phone 102. That is, after obtaining the M virtual card numbers, the server may generate the M pieces of check information according to the M virtual card numbers, where one piece of check information may be used to obtain one virtual card number. The check information may include key information used to indicate the virtual card numbers, and may further include at least one of the identity information or the number A of the mobile phone 102. The server may add the M pieces of check information to the response message and send the response message to the mobile phone 102. In this case, the response message may also be implemented by a data package carrying the M pieces of check information.

S64. After the mobile phone 102 registers the virtual SIM card service successfully, when a virtual SIM card function of the mobile phone 102 is enabled, the mobile phone 102 may send M virtual SIM card data packages to M first devices by using a short range communications module of the mobile phone 102 and using a short range communications protocol.

After the mobile phone 102 receives the response message for the allocation request message by using the radio frequency unit 310, the mobile phone 102 may obtain the M pieces of check information from the response message for the allocation request message. If a physical SIM card placed in a slot 301 is installed in the mobile phone 102, the physical SIM card may obtain the response message that is received by the radio frequency unit 310 for the allocation request message. The mobile phone 102 may store the response message for the allocation request message in the physical SIM card or a memory 320. The mobile phone 102 parses the response message for the allocation request message by using an installed APP corresponding to the physical SIM card, to obtain the M pieces of check information from the response message. Likewise, the mobile phone 102 may store the M pieces of check information in the physical SIM card or the memory 320. If a virtual SIM card is disposed in the mobile phone 102, and the virtual SIM card is a soft SIM application, the mobile phone 102 obtains, by using the soft SIM application, the response message that is received by the radio frequency unit 310 for the allocation request message. The mobile phone 102 may store the response message for the allocation request message in the memory 320, and parse the response message for the allocation request message by using the soft SIM application, to obtain the M pieces of check information from the response message. The mobile phone 102 may store the M pieces of check information in the memory 320. If a virtual SIM card is disposed in the mobile phone 102, and the virtual SIM card is an eSIM module, the mobile phone 102 obtains, by using the eSIM module, the response message that is received by the radio frequency unit 310 for the allocation request message. The mobile phone 102 may store the response message for the allocation request message in the eSIM module or the memory 320, and parse the response message for the allocation request message by using a soft SIM application corresponding to the eSIM module, to obtain the M pieces of check information from the response message. The mobile phone 102 may store the M pieces of check information in the eSIM module or the memory 320.

After obtaining the check information, the mobile phone 102 may add the check information to a generated virtual SIM card data package and send the data package to a first device by using the short range communications module of the mobile phone 102.

For example, if there are M first devices, each first device may receive a virtual SIM card data package. In this embodiment of the present invention, a smart watch 1011 used as any first device is used as an example, that is, the smart watch 1011 receives, by using a short range communications module of the smart watch 1011, a virtual SIM card data package sent by the mobile phone 102. A virtual SIM card is preinstalled in the smart watch 1011. The smart watch 1011 obtains check information from the received virtual SIM card data package by using the virtual SIM card installed in a memory 220. According to the description of step S44, the check information may include key information used to indicate a virtual card number, and may include at least one of the identity information or the number A of the mobile phone 102.

S65. Because check information obtained by a smart watch 1011 is not a virtual card number, the smart watch 1011 further needs to obtain a virtual card number. The smart watch 1011 sends the check information to the server by using a network, to request to obtain a virtual card number. For example, the smart watch 1011 may send request information used to request to obtain a virtual card number to the server, where the request information may carry the check information.

S66. The server receives, by using the network, the request information sent by the smart watch 1011, and parses the request information to obtain the check information carried in the request information. The server may check key information that is used to obtain a virtual card number and included in the check information. In addition, if the check information further includes identity information of the mobile phone 102, the server further checks the identity information of the mobile phone 102; or if the check information further includes the number A, the server further checks the number A. If the check succeeds, the server may determine, according to the identity information or the number A of the mobile phone 102 that is carried in the check information, the virtual card numbers allocated to the number A. In this case, the server may select a virtual card number from the virtual card numbers allocated to the number A, and allocate the virtual card number to the smart watch 1011.

S67. The server sends, to the smart watch 1011 by using the network, the virtual card number allocated to the smart watch 1011.

S68. The server establishes a charge association between the virtual card number allocated to the smart watch 1011 and the number A.

In this embodiment of the present invention, every time when the server sends a virtual card number to a first device, the server may establish a charge association for the virtual card number and the number A. If the server allocates a plurality of virtual card numbers to the number A, and some of the virtual card numbers are not sent to first devices, the server may temporarily not establish charge associations for the virtual card numbers that are not sent and the number A. This may ensure that virtual card numbers for which charge associations are established are all used virtual card numbers, that is, ensure that the established charge associations are effective. In this case, step S67 may be performed before step S68, or step S67 may be performed after step S68, or step S67 and step S68 may be performed simultaneously. Alternatively, step S68 may be replaced with "The server establishes charge associations for all the virtual card numbers allocated to the number A and the number A". In this case, step S68 may occur in any position after step S62.

After the smart watch 1011 receives the virtual card number, if determining that the charge association is established between the received virtual card number and the number A, and that the virtual card number is activated, the smart watch 1011 can perform communication by using a radio frequency unit 210 in the network provided by the mobile communications operator. A charge generated by the virtual card number during communication in the network provided by the mobile communications operator will be counted into the charge of the number A. In addition, for how to activate the virtual card number, refer to descriptions in the foregoing embodiment.

Figure 7:
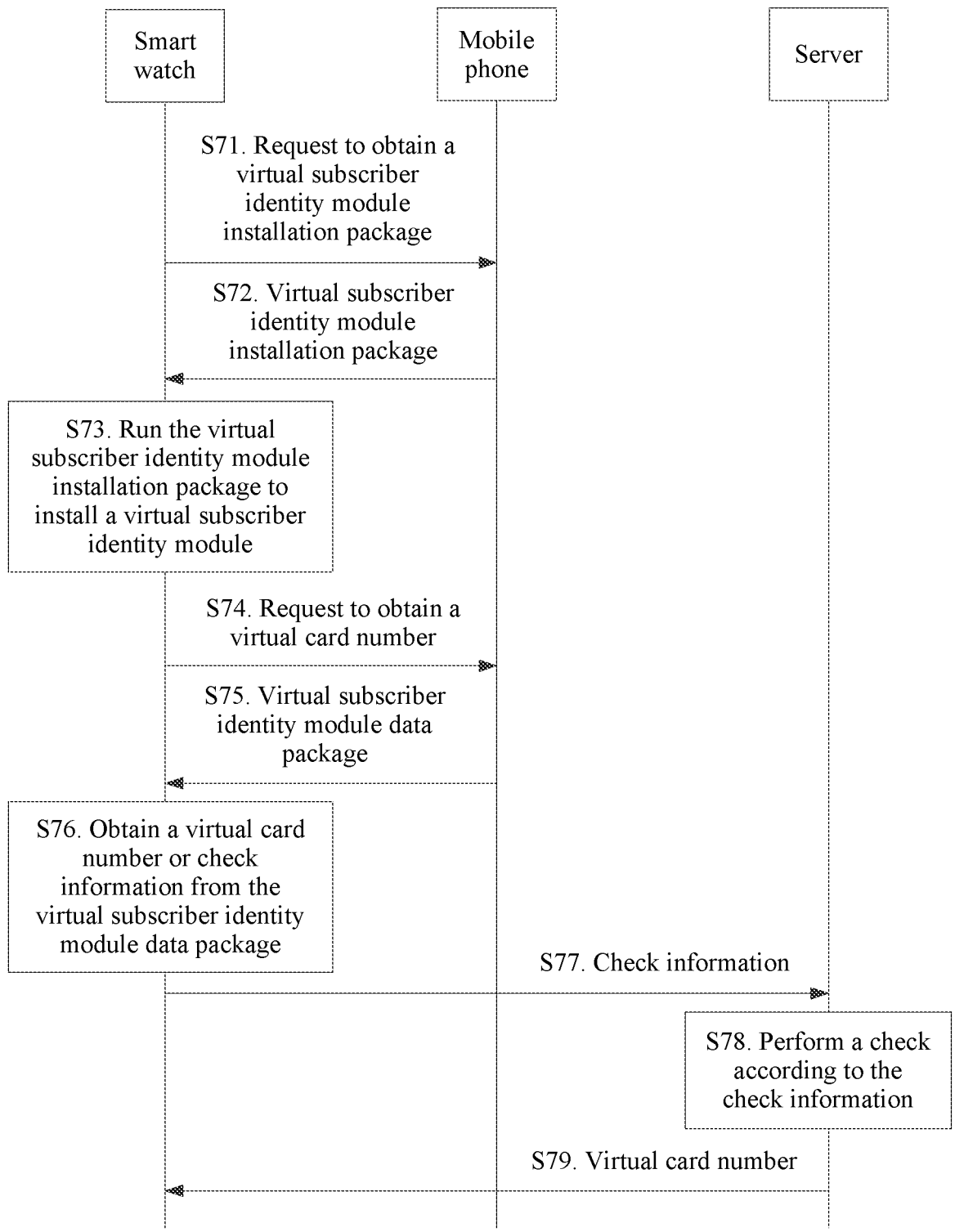
FIG. 7 is a flowchart of a method for allocating a virtual card number to a first device according to an embodiment of the present invention.

Referring to FIG. 7, an embodiment of the present invention provides an embodiment of a method for allocating a virtual card number. In the foregoing embodiment, a virtual SIM card is preinstalled in the smart watch 1011. In this embodiment of the present invention, a case in which no virtual SIM card is preinstalled or no soft SIM application corresponding to a virtual SIM card in a form of an eSIM module is preinstalled in a smart watch 1011 is described, that is, this embodiment relates to how the smart watch 1011 installs a virtual SIM card or installs a soft SIM application corresponding to an eSIM module.

S71. A smart watch 1011 requests, by using a short range communications module of the smart watch 1011, to obtain a virtual subscriber identity module installation package from a mobile phone 101, where the installation package may also be referred to as a virtual SIM card installation package.

The installation package may be used to install a soft SIM application, and the soft SIM application may be a virtual SIM card itself, or a virtual SIM card in a form of an eSIM module disposed in the smart watch 1011. In this case, the soft SIM application is an application corresponding to the eSIM module.

No soft SIM application used as a virtual SIM card is preinstalled in the smart watch 1011, or an eSIM module is disposed in the smart watch 1011, but no soft SIM application corresponding to the eSIM module is installed. If a user using the smart watch 1011 needs to perform communication, by using the smart watch 1011, in a network provided by a mobile communications operator, the user using the smart watch 1011 may request, by using the smart watch 1011, to obtain the virtual SIM card installation package from the mobile phone 102.

S72. The mobile phone 102 sends the virtual SIM card installation package to the smart watch 1011 by using a short range communications module of the mobile phone 102 and using a short range communications protocol, and the smart watch 1011 may receive, by using the short range communications module of the smart watch 1011, the virtual SIM card installation package sent by the mobile phone 102.

If a memory 320 of the mobile phone 102 stores the virtual SIM card installation package, the mobile phone 102 may directly send the virtual SIM card installation package to the smart watch 1011 by using the short range communications module of the mobile phone 102. If the memory 320 of the mobile phone 102 does not store the virtual SIM card installation package, the mobile phone 102 may first request to obtain the virtual SIM card installation package from another device, and then send the obtained virtual SIM card installation package to the smart watch 1011. For example, the mobile phone 102 may request, by using a radio frequency unit 310, to obtain the virtual SIM card installation package from a server of the mobile communications operator, or certainly may request to obtain the virtual SIM card installation package from another device. Alternatively, if the memory 320 of the mobile phone 102 does not store the virtual SIM card installation package, the mobile phone 102 may send a failure response message to the smart watch 1011 by using the short range communications module, that is, notify the smart watch 1011 that obtaining fails, and the procedure ends.

S73. A processor 290 of the smart watch 1011 runs the virtual SIM card installation package, and after installation, a software module obtained and installed in a memory 220 is a soft SIM application used as a virtual SIM card, or a SIM application corresponding to an eSIM module.

S74. The smart watch 1011 requests, by using the short range communications module of the smart watch 1011, to obtain a virtual card number from the mobile phone 102.

After the soft SIM application used as the virtual SIM card or the soft SIM application corresponding to the eSIM module is obtained after installation, if the user using the smart watch 1011 needs to perform communication by using the smart watch 1011 in the network provided by the mobile communications operator, the user using the smart watch 1011 may input an instruction to the smart watch 1011 by using an input unit 230 of the smart watch 1011. In this case, the smart watch 1011 requests, by using the short range communications module of the smart watch 1011, to obtain the virtual card number corresponding to the virtual SIM card from the mobile phone 101. Alternatively, the mobile phone 102 may send the virtual card number to the smart watch 1011 when sending the virtual SIM card installation package to the smart watch 1011, or without being requested by the smart watch 1011, the mobile phone 102 may actively send the virtual card number to the smart watch 1011 after sending the virtual SIM card installation package to the smart watch 1011, and this reduces an interaction process between devices.

S75. The mobile phone 102 sends a virtual SIM card data package to the smart watch 1011 by using the short range communications module of the mobile phone 102.

The virtual SIM card data package may carry a virtual card number allocated to the smart watch 1011, or may carry check information used to obtain a virtual card number. For descriptions about the check information, refer to the embodiment shown in FIG. 6.

If the memory 320 of the mobile phone 102 stores an unallocated virtual card number, the mobile phone 102 may directly send the virtual card number to the smart watch 1011 by using the short range communications module of the mobile phone 102, or if the memory 320 of the mobile phone 102 stores check information, and a virtual card number corresponding to the check information is not allocated, the mobile phone 102 may directly send the check information to the smart watch 1011 by using the short range communications module of the mobile phone 102. However, if the memory 320 of the mobile phone 102 does not store in advance an unallocated virtual card number or check information corresponding to an unallocated virtual card number, the mobile phone 102 may first send, by using the radio frequency unit 310, an allocation request message to the server provided by the mobile communications operator, to request to obtain a virtual card number. If the server sends a virtual card number to the mobile phone 102 according to the allocation request message, the mobile phone 102 may send the virtual card number to the smart watch 1011 by using the short range communications module of the mobile phone 102. If the server sends check information to the mobile phone 102 according to the allocation request message, the mobile phone 102 may send the check information to the smart watch 1011 by using the short range communications module of the mobile phone 102. For how the mobile phone 102 obtains a virtual card number or check information by interacting with the server, refer to the descriptions in the foregoing embodiment.

S76. The smart watch 1011 obtains a virtual card number or check information from the virtual SIM card data package by using the virtual SIM card.

S77. The smart watch 1011 sends the check information to a server by using a network, to request to obtain the virtual card number.

If the smart watch 1011 obtains the check information from the virtual SIM card data package by using the virtual SIM card, the smart watch 1011 needs to further interact with the server to obtain the virtual card number.

S78. The server receives, by using the network, the check information sent by the smart watch 1011, and may check key information included in the check information and used to obtain the virtual card number. In addition, if the check information further includes identity information of the mobile phone 102, the server further checks the identity information of the mobile phone 102, or if the check information further includes a number A, the server further checks the number A. If the check succeeds, the server may determine, according to the identity information or the number A of the mobile phone 102 that is carried in the check information, virtual card numbers allocated to the number A. In this case, the server may select a virtual card number from the virtual card numbers allocated to the number A, and allocate the virtual card number to the smart watch 1011.

S79. The server sends, to the smart watch 1011 by using the network, the virtual card number allocated to the smart watch 1011.

Step S77 to step S79 are a case in which the smart watch 101 obtains the check information by using the virtual SIM card data package. If the smart watch 1011 obtains the virtual card number from the virtual SIM card data package by using the virtual SIM card, step S77 to step S79 do not need to be performed.

After the smart watch 1011 receives the virtual card number, if determining that a charge association is established between the received virtual card number and the number A, and that the virtual card number is activated, the smart watch 1011 can perform communication by using a radio frequency unit 210 in the network provided by the mobile communications operator. A charge generated by the virtual card number during communication in the network provided by the mobile communications operator will be counted into a charge of the number A. In addition, for a problem about how to activate the virtual card number and how to establish the charge association, refer to descriptions in the foregoing embodiment.

An embodiment of the present invention provides an embodiment of a method for allocating a virtual card number. In this embodiment of the present invention, another manner of obtaining M virtual card numbers by a mobile phone 102 is described, that is, the M virtual card numbers may be preset in the mobile phone 102, and therefore, the mobile phone 102 may obtain the virtual card numbers without requesting a server. This reduces an interaction process between the mobile phone 102 and the server.

A user adds the M virtual card numbers to the mobile phone 102 manually, and the mobile phone 102 may store the M virtual card numbers in a memory 320. The user may request to obtain the M virtual card numbers from a mobile communications operator in advance. For example, the user may obtain the M virtual card numbers from a website of the mobile communications operator or a service center of the mobile communications operator. Alternatively, the manner of obtaining the M virtual card numbers by the mobile phone 102 may be: when the mobile phone 102 is delivered from a factory, a mobile communications operator directly allocates the M virtual card numbers to the mobile phone 102, and the M virtual card numbers may be stored in the memory 320 of the mobile phone 102. For example, correspondingly, the mobile communications operator may directly allocate the M virtual card numbers to communications operator branded smartphones (China Unicom branded smartphones or China Mobile branded smartphones or the like), and may store the M virtual card numbers in the communications operator branded smartphones.

For the M virtual card numbers preset in the mobile phone 102, the server may establish charge associations for the virtual card numbers and a number A of the mobile phone 102 in advance, that is, all the M virtual card numbers preset in the mobile phone 102 may be virtual card numbers for which charge associations are established with the number A of the mobile phone 102, or the server may establish charge associations for the virtual card numbers and the number A of the mobile phone 102 when subsequently requested by the mobile phone 102. For how the mobile phone 102 requests to establish charge associations for the virtual card numbers and the number A, refer to descriptions in the foregoing embodiment.

That is, in this embodiment of the present invention, the mobile phone 102 may directly obtain the M virtual card numbers without requesting the server.

If the mobile phone 102 has not subscribed to a virtual SIM card service, the user may interact with a touchscreen 331 of the mobile phone 102 to input an instruction, so that a radio frequency unit 310 of the mobile phone 102 sends, by using the number A, an allocation request message to the server provided by the mobile communications operator, where the allocation request message may be used to request to register and subscribe to the virtual SIM card service. The allocation request message may carry the number A of the mobile phone 102. After the server receives the allocation request message that is used to register and subscribe to the virtual SIM card service and sent by the mobile phone 102 by using the number A, the server may determine whether to allow the mobile phone 102 to subscribe to the virtual SIM card service.

In this embodiment of the present invention, if the server determines to allow the mobile phone 102 to subscribe to the virtual SIM card service, the server sends a response message for the allocation request message to the mobile phone 102, where the response message is used to indicate that the virtual SIM card service is subscribed to successfully. Because the M virtual card numbers are preset in the mobile phone 102, the server does not need to send the virtual card numbers to the mobile phone 102 again. The mobile phone 102 receives the response message by using the radio frequency unit 310, and may determine, according to the response message, whether the virtual SIM card service is subscribed to successfully.

If the mobile phone 102 has subscribed to the virtual SIM card service successfully, the mobile phone 102 naturally does not need to send an allocation request message to the server, and also does not need to receive a response message sent by the server for the allocation request message.

After the mobile phone 102 determines that the virtual SIM card service is subscribed to successfully, when a virtual SIM card function of the mobile phone 102 is enabled, the mobile phone 102 may send any one of the M virtual card numbers to a smart watch 1011 by using a short range communications module of the mobile phone 102 and using a short range communications protocol. For example, the mobile phone 102 may send a virtual SIM card data package to the smart watch 1011, where the virtual SIM card data package may carry a virtual card number.

The smart watch 1011 receives the virtual SIM card data package by using a short range communications module of the smart watch 1011, and the smart watch 1011 obtains the virtual card number from the virtual SIM card data package. After obtaining the virtual card number, the smart watch 1011 communicates, by using a radio frequency unit 210 and using the virtual card number, with another device in a network provided by the mobile communications operator.

An embodiment of the present invention provides an embodiment of a method for allocating a virtual card number. In this embodiment of the present invention, an improved solution of step S25 in the embodiment shown in FIG. 2 is described, that is, how a mobile phone 102 allocates a virtual card number to a smart watch 1011 is described. In addition, in this embodiment of the present invention, for example, the mobile phone 102 requests a virtual SIM card service in advance, that is, the mobile phone 102 requests in advance to register and subscribe to the virtual SIM card service from a server provided by a mobile communications operator.

In this embodiment of the present invention, a soft SIM application used as a virtual SIM card is installed in the mobile phone 102. In this case, a user taps an icon of the soft SIM application on a touchscreen 331 of the mobile phone 102 to invoke the soft SIM application, and invoking the soft SIM application is equivalent to enabling a virtual SIM card function.

When the mobile phone 102 runs the soft SIM application, a short range communications module of the mobile phone 102 detects that short range communication is performed between the mobile phone 102 and the smart watch 1011. For example, the communication may be NFC communication, or a Wi-Fi direct connection, or the mobile phone 102 and the smart watch 1011 are connected to a same local area network, or the like. In this case, the mobile phone 102 sends a first request message to the smart watch 1011 by using the short range communications module of the mobile phone 102, where the first request message may be used to request to allocate a virtual card number to the smart watch 1011.

In another implementation, before the mobile phone 102 sends the first request message to the smart watch 1011, the mobile phone 102 may first further obtain capability information of the smart watch 1011 by using the short range communications module of the mobile phone 102. If the capability information of the smart watch 1011 indicates that the smart watch 1011 supports the virtual SIM card service, the mobile phone 102 sends the first request message to the smart watch 1011 by using the short range communications module of the mobile phone 102. If the capability information of the smart watch 1011 indicates that the smart watch 1011 does not support the virtual SIM card service, the procedure ends.

The capability information of the smart watch 1011 may include a communication capability, as described in the foregoing embodiment. In this embodiment of the present invention, the capability information of the smart watch 1011 may further include information used to indicate whether the smart watch 1011 supports the virtual SIM card service.

If the mobile phone 102 knows in advance whether the smart watch 1011 supports the virtual SIM card service, the mobile phone 102 may directly send the first request message to the smart watch 1011, without obtaining the capability information of the smart watch 1011.

After the smart watch 1011 receives the first request message by using a short range communications module of the smart watch 1011, the smart watch 1011 may send a response message for the first request message to the mobile phone 102 by using the short range communications module of the smart watch 1011. The response message for the first request message may be used to indicate whether the smart watch 1011 agrees to allocate a virtual card number to the smart watch 1011. For example, after receiving the first request message, the smart watch 1011 may perform displaying on a touchscreen 231 to provide for the user. For example, the user may press a confirm key on the touchscreen 231 to determine to agree to receive the virtual card number, or may press a cancel key on the touchscreen 231 to determine not to agree to receive the virtual card number. In this case, a processor 290 of the smart watch 1011 may generate a response message for the first request message according to a user operation.

After the mobile phone 102 receives the response message for the first request message by using the short range communications module of the mobile phone 102, if a processor 390 determines that the response message for the first request message is used to indicate that the smart watch 1011 agrees to allocate the virtual card number to the smart watch 1011, the processor 390 determines that the virtual card number may be allocated to the smart watch 1011. If the response message for the first request message is used to indicate that the smart watch 1011 does not agree to allocate the virtual card number to the smart watch 1011, the processor 390 determines that the virtual card number may not be allocated to the smart watch 1011.

If a memory 320 of the mobile phone 102 already stores M virtual card numbers sent by the server provided by the mobile communications operator, the mobile phone 102 may send one of the M virtual card numbers to the smart watch 1011 by using the short range communications module of the mobile phone 102. If the memory 320 of the mobile phone 102 already stores the M virtual card numbers, the M virtual card numbers may be obtained by the mobile phone 102 by sending an allocation request message to the server, or may be preset in the mobile phone 102 when the mobile phone 102 is delivered from a factory. However, if the memory 320 of the mobile phone 102 does not store any virtual card number sent by the server provided by the mobile communications operator, the mobile phone 102 may first request to obtain a virtual card number from the server. The server may allocate M virtual card numbers to the mobile phone 102, and the server may send the M virtual card numbers to the mobile phone 102. The mobile phone 102 may send one of the M virtual card numbers to the smart watch 1011 by using the short range communications module of the mobile phone 102, or the server may generate M pieces of check information according to the M virtual card numbers, and send the M pieces of check information to the mobile phone 102, where each piece of check information may be used to obtain one virtual card number. The mobile phone 102 receives the M pieces of check information, and may send one of the M pieces of check information to the smart watch 1011 by using the short range communications module of the mobile phone 102, and the smart watch 1011 may obtain the virtual card number according to the check information.

For some implementation processes, refer to descriptions of each of the foregoing embodiments. Details are not described again.

An embodiment of the present invention provides an embodiment of a method for allocating a virtual card number. In this embodiment of the present invention, an improved solution of step S25 in the embodiment shown in FIG. 2 is described, that is, how a mobile phone 102 allocates a virtual card number to a smart watch 1011 is described. In addition, in this embodiment of the present invention, for example, the mobile phone 102 requests a virtual SIM card service in advance, that is, the mobile phone 102 requests in advance to register and subscribe to a virtual SIM card service from a server provided by a mobile communications operator.

In this embodiment of the present invention, a soft SIM application used as a virtual SIM card is installed in the smart watch 1011. In this case, a user taps an icon of the soft SIM application on a touchscreen 231 of the mobile phone 1011 to invoke the soft SIM application, and invoking the soft SIM application is equivalent to enabling a virtual SIM card function.

When the smart watch 1011 runs the soft SIM application, the smart watch 1011 may send an indication message to the mobile phone 102 by using a short range communications module of the smart watch 1011 and using a short range communications protocol, where the indication message may be used to indicate that no virtual card number is allocated to the smart watch 1011, or it may be understood that the indication message may be used to request to allocate a virtual card number to the smart watch 1011.

After the mobile phone 102 receives the indication message by using a short range communications module of the mobile phone 102, the mobile phone 102 determines, according to the indication message, that a virtual card number may be allocated to the smart watch 1011, and therefore, the mobile phone 102 may allocate the virtual card number to the smart watch by using the short range communications module of the mobile phone 102. For example, after the mobile phone 102 receives the indication message by using the short range communications module of the mobile phone 102, the mobile phone 102 may perform displaying on a touchscreen 331 to provide for the user. For example, the user may press a confirm key on the touchscreen 331 to determine that the virtual card number may be allocated to the smart watch 1011, or may press a cancel key on the touchscreen 331 to determine not to allocate the virtual card number to the smart watch 1011. In this case, a processor 390 of the mobile phone 102 may determine, according to a user operation, whether to allocate the virtual card number to the smart watch 1011. For example, if the user presses the confirm key, the mobile phone 102 may determine to allocate the virtual card number to the smart watch 1011.

In an implementation, if the mobile phone 102 has not subscribed to the virtual SIM card service, after receiving the indication message, the mobile phone 102 may first prompt the user to determine whether to register and subscribe to the virtual SIM card service. For example, the mobile phone 102 may prompt the user by outputting a prompt box on the touchscreen 331. If the user determines to register and subscribe to the virtual SIM card service, the user inputs, on the touchscreen 331, information about determining to register and subscribe to the virtual SIM card service. In this case, the mobile phone 102 requests to subscribe to the virtual SIM card service from the server provided by the mobile communications operator. For example, the mobile phone 102 may send an allocation request message to the server by using a radio frequency unit 310, where the allocation request message may be used to request to register and subscribe to the virtual SIM card service. The allocation request message may carry a number A of the mobile phone 102. After the mobile phone 102 determines to register and subscribe to the virtual SIM card service, the mobile phone 102 may allocate the virtual card number to the smart watch 1011 by using the short range communications module of the mobile phone 102. Certainly, if the mobile phone 102 has registered and subscribed to the virtual SIM card service, the mobile phone may directly allocate the virtual card number to the smart watch 1011, without registering and subscribing to the virtual SIM card service again.

In another implementation, that the mobile phone 102 requests to register and subscribe to the virtual SIM card service from the server provided by the mobile communications operator may be further implemented in the following manner: If the mobile phone 102 determines to register and subscribe to the virtual SIM card service, the processor 390 of the mobile phone 102 may download an installation package of a virtual SIM card, where the virtual SIM card is a soft SIM application. After downloading the installation package, the processor 390 of the mobile phone 102 may run the installation package to install the soft SIM application. The mobile phone 102 runs the soft SIM application, and requests, by using the soft SIM application and the radio frequency unit 310, to register and subscribe to the virtual SIM card service from the server provided by the mobile communications operator. The mobile phone 102 may send an allocation request message to the server by using the soft SIM application and the radio frequency unit 310, where the allocation request message may be used to request to register and subscribe to the virtual SIM card service, and the allocation request message may carry the number A of the mobile phone 102.

This embodiment of the present invention may ensure as much as possible that a virtual card number is allocated to a first device that has a requirement, reduce waste of virtual card numbers as much as possible, and also ensure as much as possible that all first devices having requirements can obtain virtual card numbers.

For some implementation processes, for example, how the mobile phone 102 allocates a virtual card number to the smart watch 1011, refer to the foregoing embodiments.

An embodiment of the present invention provides an embodiment of a method for allocating a virtual card number. In this embodiment of the present invention, an implementation in which a smart watch 1011 sends an indication message to a mobile phone 102 is described, that is, an occasion on which the smart watch 1011 sends the indication message to the mobile phone 102 is described. In this embodiment of the present invention, the mobile phone 102 does not request a virtual SIM card service in advance, that is, the mobile phone 102 does not request in advance to register and subscribe to the virtual SIM card service from a server provided by a mobile communications operator.

If the mobile phone 102 has not established a short range communications connection to the smart watch 1011, the mobile phone 102 and the smart watch 1011 may be paired by using their short range communications modules and using a short range communications protocol. After the mobile phone 102 and the smart watch 1011 are paired successfully, if the smart watch 1011 supports the virtual SIM card service, the smart watch 1011 may send an indication message to the mobile phone 102 by using the short range communications module of the smart watch 1011, where the indication message may be used to indicate that no virtual card number is allocated to the smart watch 1011, or it may be understood that the indication message may be used to request to allocate a virtual card number to the smart watch 1011.

After the mobile phone 102 receives the indication message by using the short range communications module of the mobile phone 102, if the mobile phone 102 has not subscribed to the virtual SIM card service, a processor 390 of the mobile phone 102 may output a prompt box on a touchscreen 331, where the prompt box is used to prompt a user whether to register and subscribe to the virtual SIM card service. If the user determines to register and subscribe to the virtual SIM card service, the user performs an operation on the touchscreen 331, and inputs, by using the prompt box displayed on the touchscreen 331, information about confirming to subscribe to the virtual SIM card service. In this case, the processor 390 of the mobile phone 102 may download an installation package of a virtual SIM card, where the virtual SIM card is a soft SIM application. After downloading the installation package, the processor 390 of the mobile phone 102 may run the installation package to install the soft SIM application. After the installation, the mobile phone 102 runs the soft SIM application, and requests, by using the soft SIM application and using a radio frequency unit 310, to register and subscribe to the virtual SIM card service from the server provided by the mobile communications operator. For example, the mobile phone 102 may send an allocation request message to the server by using the soft SIM application and using the radio frequency unit 310, where the allocation request message may be used to request to register and subscribe to the virtual SIM card service. The allocation request message may carry a number A of the mobile phone 102.

After the mobile phone 102 registers and subscribes to the virtual SIM card service successfully, the mobile phone 102 may allocate a virtual card number to the smart watch 1011 by using the short range communications module of the mobile phone 102.

For some implementation processes, for example, how the mobile phone 102 registers and subscribes to the virtual SIM card service, how the mobile phone 102 obtains the virtual card number, how the virtual card number is allocated to the smart watch 1011, and other content, refer to the foregoing embodiments.

In the foregoing embodiments, how the mobile phone 102 obtains M virtual card numbers and how the virtual card numbers are allocated to the first devices are mainly described. Further, after the mobile phone 102 allocates the virtual card numbers to the M first devices, the mobile phone 102 may further manage authority of the first devices to use the virtual card numbers allocated to the first devices, that is, in a process in which a first device uses an allocated virtual card number, authority of the first device to use the virtual card number may be determined by the second device. The authority of the first device to use the virtual card number may include authority of the first device to perform voice communication with another device by using the virtual card number in the network provided by the mobile communications operator, and may further include authority of the first device to perform video communication with another device by using the virtual card number in the network provided by the mobile communications operator, and may further include authority of the first device to perform communication with another device by using a short message in the network provided by the mobile communications operator, and certainly may further include other possible authority.

How the mobile phone 102 manages the authority of the first device to use the virtual card number allocated to the first device is described by using an example in which the first device is the smart watch 1011. In an implementation, after allocating a virtual card number to the smart watch 1011, the mobile phone 102 may monitor the smart watch 1011 in real time or periodically, to determine whether the smart watch 1011 satisfies a condition for updating authority to use a virtual subscriber identity, that is, determine whether the smart watch 1011 satisfies a condition for updating authority to use a virtual card number allocated to the smart watch 1011. If the smart watch 1011 satisfies the condition for updating authority to use the virtual card number allocated to the smart watch 1011, the processor 390 of the mobile phone 102 determines that a trigger condition of the mobile phone 102 is satisfied. In this case, the processor 390 of the mobile phone 102 may generate a trigger instruction. The mobile phone 102 may update, by using the processor 390 to execute the trigger instruction, the authority to use the virtual card number allocated to the smart watch 1011. For example, the mobile phone 102 may instruct the smart watch 1011 to stop using all or some functions of the virtual card number. Alternatively, the mobile phone 102 may directly instruct the smart watch 1011 to stop using the virtual card number, and it may be understood that the mobile phone 102 recycles the virtual card number. After updating the use authority, the mobile phone 102 may send a notification message to the smart watch 1011, and the smart watch 1011 may know how to use the virtual card number subsequently. By executing the trigger instruction, the mobile phone 102 may locally update the authority to use the virtual card number. Alternatively, by using the server provided by the mobile communications operator, the mobile phone 102 may modify the authority to use the virtual card number, to achieve an objective of updating the authority to use the virtual card number, that is, the processor 390 of the mobile phone 102 executes the trigger instruction, and sends, by using the radio frequency unit 310, a request message used to request to modify the authority to use the virtual card number to the server provided by the mobile communications operator, so that the server modifies the authority to use the virtual card number.

It may be understood that, that the mobile phone 102 manages the authority to use the virtual card number is: after the virtual card number is allocated to the first device, the mobile phone 102 may be further responsible for managing authority to use each virtual card number, and for any first device to which a virtual card number is allocated, the mobile phone 102 may control authority to use the virtual card number allocated to the first device. If the mobile phone 102 determines that a first device satisfies a condition for updating authority to use a virtual card number allocated to the first device, the mobile phone 102 may update the authority of the first device to use the virtual card number allocated to the first device. The use authority may also be updated in different updating manners. For example, the mobile phone 102 may cancel all authority of the first device to use the virtual card number, or the mobile phone 102 may cancel some authority of the first device to use the virtual card number, or the mobile phone 102 may recycle the virtual card number allocated to the first device.

If the mobile phone 102 cancels all authority of the first device to use the virtual card number, or cancels some authority of the first device to use the virtual card number, the authority of the virtual card number that is canceled by the mobile phone 102 cannot be used by the first device any longer. In this way, the virtual card number can be managed better, so that the virtual card number can be used under management of the second device. In this case, for example, if the mobile phone 102 updates the authority of the first device to use the virtual card number allocated to the first device, the authority canceled by the mobile phone 102 cannot be used by the first device any longer, but the virtual card number is still used by the first device, that is, the virtual card number still belongs to the first device, and the mobile phone 102 does not allocate the virtual card number to another first device.

Recycling a virtual card number allocated to a first device by the mobile phone 102 may include two meanings: The mobile phone 102 instructs the first device to stop using all functions of the virtual card number allocated to the first device, and the mobile phone 102 may reallocate the virtual card number to another first device. In this case, it is considered that the first device does not have the virtual card number any longer.

With respect to whether a first device satisfies a condition for updating authority to use a virtual card number allocated to the first device, different content may be included. In the following description, it is still assumed that the first device is the smart watch 1011.

1. Duration condition: It may be understood that the duration condition is: if an upper limit of duration, indicated in time information carried in the virtual SIM card data package, for using the virtual card number allocated to the smart watch 1011 is reached, the mobile phone 102 determines that the smart watch 1011 satisfies the condition for updating authority to use the virtual card number allocated to the smart watch 1011.

When sending the virtual SIM card data package to the smart watch 1011, the mobile phone 102 may add time information to the virtual SIM card data package, where the time information may be used to indicate a term of authority of the smart watch 1011 to use the virtual card number. In this case, the smart watch 1011 may determine, according to the time information, the term of the authority to use the virtual card number. For example, the smart watch 1011 may determine, according to the time information before a time indicated by the time information arrives, that the smart watch 1011 has all authority to use the obtained virtual card number. If the mobile phone 102 determines, according to the time information, that the upper limit of the duration for using the virtual card number allocated to the smart watch 1011 is reached, the mobile phone 102 may determine that the smart watch 1011 satisfies the condition for updating the authority to use the virtual card number allocated to the smart watch 1011.

2. Location condition: It may be understood that the location condition is: if a location of the smart watch 1011 is changed between locations indicated by location information carried in the virtual SIM card data package, the mobile phone 102 determines that the smart watch 1011 satisfies the condition for updating the authority to use the virtual card number allocated to the smart watch 1011.

When sending the virtual SIM card data package to the smart watch 1011, the mobile phone 102 may add location information to the virtual SIM card data package, where the location information may indicate some trusted places, and the location information is associated with the authority to use the virtual card number. Different location information corresponds to different authority to use the virtual card number. For example, the location information may be used to indicate one or more locations. If the location information is used to indicate a plurality of locations, different locations in the plurality of locations indicated by the location information may correspond to different authority to use the virtual card number. In some or all of the plurality of locations indicated by the location information, the smart watch 1011 may have all authority to use the virtual card number. If the smart watch 1011 has all use authority in some locations indicated by the location information, the smart watch 1011 has some authority to use the virtual card number in remaining locations indicated by the location information. In a location that is not indicated by the location information, the smart watch 1011 possibly cannot use the virtual card number. The smart watch 1011 may determine, according to the location information, the authority to use the virtual card number. If the location of the smart watch 1011 is changed between the locations indicated by the location information, for example, if the smart watch 1011 moves from one location indicated by the location information to another location indicated by the location information, the mobile phone 102 may determine that the smart watch 1011 satisfies the condition for updating authority to use the virtual card number allocated to the smart watch 1011. Certainly, if the smart watch 1011 is to satisfy the condition for updating authority to use the virtual card number allocated to the smart watch 1011, locations of the smart watch 1011 before and after the change need to correspond to different authority to use the virtual card number. In addition, because the smart watch 1011 may further move to a location that is not indicated by the location information, in addition to the location indicated by the location information, wherever the smart watch 1011 moves, as long as the locations of the smart watch 1011 before and after the movement correspond to different authority to use the virtual card number, the mobile phone 102 may determine that the smart watch 1011 satisfies the condition for updating the authority to use the virtual card number allocated to the smart watch 1011.

For example, the location information carried in the virtual SIM card data package indicates three locations in total, namely, a location 1, a location 2, and a location 3, and the following is specified: If the smart watch 1011 is in the location 1, the smart watch 1011 has all authority to use the virtual card number, and all use authority of the smart watch 1011 includes authority 1, authority 2, and authority 3; if the smart watch 1011 is in the location 2, the smart watch 1011 has some authority to use the virtual card number, and the use authority includes authority 1 and authority 2; if the smart watch 1011 is in the location 3, the smart watch 1011 has some authority to use the virtual card number, and the use authority includes authority 3; or if the smart watch 1011 is in a location 4, that is, not a location indicated by the location information, the smart watch 1011 cannot use the virtual card number, that is, the smart watch 1011 has no authority to use the virtual card number. The smart watch 1011 may determine, according to the location of the smart watch 1011 and the location information, the authority to use the virtual card number. Likewise, the mobile phone 102 may also determine, according to the location of the smart watch 1011 and the location information, the authority to use the virtual card number. If the mobile phone 102 determines that a current location of the smart watch 1011 is changed, where the change includes that the smart watch 1011 moves from a location indicated by the location information to a location not indicated by the location information, or that the smart watch 1011 moves from a location not indicated by the location information to any location indicated by the location information, or that the smart watch 1011 moves from a location indicated by the location information to another location indicated by the location information, as long as the locations of the smart watch 1011 before and after the movement correspond to different authority to use the virtual card number, the mobile phone 102 may determine that the smart watch 1011 satisfies the condition for updating the authority to use the virtual card number allocated to the smart watch 1011. The smart watch 1011 may actively send the location of the smart watch 1011 to the mobile phone 102, or the mobile phone may actively request to obtain the current location of the smart watch 1011, or the like.

In the location condition, if the smart watch 1011 moves from a location indicated by the location information to a location not indicated by the location information, the mobile phone 102 may update the authority of the smart watch 1011 to use the virtual card number. After the update, the smart watch 1011 cannot use the virtual card number. That is, herein the mobile phone 102 modifies the authority of the smart watch 1011 to use the virtual card number, possibly because the mobile phone recycles the virtual card number allocated to the smart phone 1011. Afterward, the smart watch 1011 moves again, and if the smart watch 1011 moves from a location not indicated by the location information to any location indicated by the location information, the mobile phone 102 may also update, according to the use authority corresponding to the current location of the smart watch 1011, the authority of the smart watch 1011 to use the virtual card number. After the update, the smart watch 1011 may obtain again all authority or some authority to use the virtual card number. In addition, because the mobile phone 102 previously recycles the virtual card number allocated to the smart watch 1011, when the mobile phone 102 updates the use authority again, the mobile phone 102 may first allocate a virtual card number to the smart watch 1011, and may reallocate the virtual card number that is previously recycled to the smart watch 1011, or may reallocate a new virtual card number to the smart watch 1011.

3. Short range communications connection condition: It may be understood that the short range communications connection condition is: if the mobile phone 102 determines that a short range communications connection to the smart watch 1011 is broken, the mobile phone 102 may determine that the smart watch 1011 satisfies the condition for updating the authority to use the virtual card number allocated to the smart watch 1011.

In the short range communications connection condition, that the short range communications connection between the mobile phone 102 and the smart watch 1011 is broken may include different cases. For example, when a distance between the mobile phone 102 and the smart watch 1011 is greater than a distance that can be supported by the short range communications protocol, the connection between the mobile phone 102 and the smart watch 1011 may be broken. In this case, the mobile phone 102 may still store pairing information with the smart watch 1011, but the connection between the two devices is broken. Alternatively, for example, if the mobile phone 102 actively cancels the short range communications connection to the smart watch 1011, or the smart watch 1011 actively cancels the short range communications connection to the mobile phone 102, regardless of whether the distance between the two devices is greater than the distance that can be supported by the short range communications protocol or is less than or equal to the distance that can be supported by the short range communications protocol, the connection between the two devices is broken. In this case, the mobile phone 102 may still store pairing information with the smart watch 1011, or the mobile phone 102 may directly cancel the pairing information with the smart watch 1011.

In the short range communications connection condition, after the mobile phone 102 updates the authority of the smart watch 1011 to use the virtual card number, if the smart watch 1011 moves, and after the movement, the mobile phone 102 determines that the short range communications connection between the smart watch 1011 and the mobile phone 102 is restored, or that a short range communications connection is reestablished between the smart watch 1011 and the mobile phone 102, the mobile phone 102 may update again the authority of the smart watch 1011 to use the virtual card number. For example, the smart watch 1011 may be instructed again to have all authority to use the virtual card number; or if all authority of the smart watch 1011 to use the virtual card number is canceled previously, the smart watch 1011 may be instructed to restore some authority of the smart watch 1011 to use the virtual card number; or if the virtual card number of the smart watch 1011 is recycled previously, the virtual card number may be reallocated to the smart watch 1011.

The mobile phone 102 may select any one of the foregoing three conditions for use, or may select any two for use. For example, the mobile phone 102 may use both the duration condition and the location condition; and the mobile phone 102 may add both time information and location information to the virtual SIM card data package and send the virtual SIM card data package to the smart watch 1011. In this case, the mobile phone 102 may determine, according to the time information, whether the smart watch 1011 satisfies the condition for updating the authority to use the virtual card number allocated to the smart watch 1011, and may also determine, according to the location information, whether the smart watch 1011 satisfies the condition for updating the authority to use the virtual card number allocated to the smart watch 1011. Alternatively, the mobile phone 102 may use all the three conditions.

The following uses several embodiments to describe how a mobile phone 102 manages authority to use a virtual card number.

An embodiment of the present invention provides an embodiment of a method for managing an allocated virtual card number by a mobile phone 102. This embodiment of the present invention focuses on how the mobile phone 102 manages the allocated virtual card number according to the foregoing duration condition. In this embodiment of the present invention, a smart watch 1011 used as a first device has received a virtual card number allocated by the mobile phone 102, and can perform communication by using the virtual card number in a network provided by a mobile communications operator.

First, the mobile phone 102 sends a virtual SIM card data package to the smart watch 1011 by using a short range communications module of the mobile phone 102, to allocate the virtual card number to the smart watch 1011. The virtual SIM card data package from the mobile phone 102 further carries time information, and duration indicated by the time information is preset duration, that is, the mobile phone 102 specifies the duration for the smart watch 1011 to use the virtual card number. In this case, after the smart watch 1011 receives the virtual SIM card data package by using a short range communications module of the smart watch 1011, the smart watch 1011 may determine, according to the time information, that before the preset duration specified by the time information expires, the smart watch 1011 has all authority to use the virtual card number. A start time of the preset duration specified by the time information may be a time at which the mobile phone 102 sends the virtual SIM card data package to the smart watch 1011.

At any time after the mobile phone 102 sends the virtual SIM card data package to the smart watch 1011, a processor 390 of the mobile phone 102 determines a current time, and determines whether duration starting from sending the virtual card number to the smart watch 1011 to the current time is already greater than or equal to the preset duration. If the mobile phone 102 determines that the duration starting from sending the virtual card number to the smart watch 1011 to the current time is already greater than or equal to the preset duration, the mobile phone 102 determines that the smart watch 1011 satisfies a condition for updating authority to use the virtual card number allocated to the smart watch 1011, and the mobile phone 102 updates the authority of the smart watch 1011 to use the virtual card number. In this embodiment of the present invention, the mobile phone 102 selects to cancel all authority of the smart watch 1011 to use the virtual card number.

In this embodiment of the present invention, that the mobile phone 102 updates the authority of the smart watch 1011 to use the virtual card number may be implemented in the following manner: The mobile phone 102 modifies local data, to update the authority of the smart watch 1011 to use the virtual card number. For example, the mobile phone 102 stores, in a memory 320, a correspondence between a first device and a virtual card number allocated to the first device, and the correspondence further includes authority to use a virtual card number allocated to each first device. In this case, the mobile phone 102 may modify the stored authority of the smart watch 1011 to use the virtual card number. In this way, the authority to use the virtual card number allocated to the smart watch 1011 is updated.

In this embodiment of the present invention, the manner of modifying the local data by the mobile phone 102 is only modifying the local data without changing network data. If the smart watch 1011 continues to use the virtual card number according to the original use authority, the use can be also implemented in the network. Therefore, the mobile phone 102 needs to notify the smart watch 1011, to prevent the smart watch 1011 from continuing to use the virtual card number according to the original use authority. In this embodiment of the present invention, after the mobile phone 102 updates the authority of the smart watch 1011 to use the virtual card number, the mobile phone 102 may send a notification message to the smart watch 1011 by using the short range communications module of the mobile phone 102, where the notification message is used to indicate that the smart watch 1011 has no authority to use the virtual card number.

After receiving the notification message by using the short range communications module of the smart watch 1011, the smart watch 1011 may stop using all functions of the virtual card number, and this is equivalent to stopping using the virtual card number. However, the virtual card number is still allocated to the smart watch 1011. Although the smart watch 1011 may not use the virtual card number temporarily, the mobile phone 102 may not allocate the virtual card number to another first device.

In addition, because the mobile phone 102 has sent the virtual SIM card data package carrying the time information to the smart watch 1011, not only the mobile phone 102 can determine whether the upper limit of the preset duration is reached, but also the smart watch 1011 can determine whether the upper limit of the preset duration is reached. Therefore, in an alternative solution for the solution in which the mobile phone 102 needs to notify the smart watch 1011 after updating the authority to use the virtual card number due to the duration condition, the mobile phone 102 and the smart watch 1011 may negotiate in advance a manner of updating the authority to use the virtual card number because the duration condition is satisfied, that is, the mobile phone 102 and the smart watch 1011 may negotiate in advance how the mobile phone 102 updates the authority to use the virtual card number due to the duration condition. In this case, if the mobile phone 102 updates the authority of the smart watch 1011 to use the virtual card number due to the duration condition, the smart watch 1011 may also not be notified. When the smart watch 1011 determines that the smart watch 1011 satisfies the duration condition, it may be determined that the authority to use the virtual card number is already updated.

An embodiment of the present invention provides an embodiment of a method for managing an allocated virtual card number by a mobile phone 102. This embodiment of the present invention focuses on how the mobile phone 102 manages the allocated virtual card number according to the foregoing location condition. In this embodiment of the present invention, a smart watch 1011 used as a first device has received a virtual card number allocated by the mobile phone 102, and can perform communication by using a radio frequency unit 210 and using the virtual card number in a network provided by a mobile communications operator.

First, the mobile phone 102 sends a virtual SIM card data package to the smart watch 1011 by using a short range communications module of the mobile phone 102, to allocate the virtual card number to the smart watch 1011. The virtual SIM card data package from the mobile phone 102 further carries location information, and the location information carried in the virtual SIM card data package may indicate one or more locations. The location indicated by the location information is associated with authority to use the virtual card number, and different locations indicated by the location information correspond to different authority to use the virtual card number. After the smart watch 1011 receives the virtual SIM card data package by using a short range communications module of the smart watch 1011, the smart watch 1011 may determine, according to the location information, the authority of the smart watch 1011 to use the allocated virtual card number.

In this embodiment of the present invention, the location information indicates two locations in total, namely, a location 1 and a location 2. The following may be preset: If the smart watch 1011 is in the location 1, the smart watch 1011 has all authority to use the virtual card number, and all authority to use the virtual card number includes authority 1 and authority 2; if the smart watch 1011 is in the location 2, the smart watch 1011 has some authority to use the virtual card number, and the use authority includes authority 1; or if the location of the smart watch 1011 is neither the location 1 nor the location 2, that is, not a location indicated by the location information, the smart watch 1011 cannot use the virtual card number, that is, the smart watch 1011 has no authority to use the virtual card number.

At any time after the mobile phone 102 sends the virtual SIM card data package to the smart watch 1011, the mobile phone 102 receives the location information sent by the smart watch 1011, and the location information sent by the smart watch 1011 is used to indicate a current location of the smart watch 1011. Alternatively, the mobile phone 102 may send a request to the smart watch 1011 to obtain the location information sent by the smart watch 1011.

If the mobile phone 102 determines, according to the location information sent by the smart watch 1011, that the current location of the smart watch 1011 is the location 2, and a change occurs relative to the previous location 1 of the smart watch 1011, the mobile phone 102 determines that the smart watch 1011 satisfies the condition for updating the authority to use the virtual card number allocated to the smart watch 1011. In this case, the mobile phone 102 updates the authority of the smart watch 1011 to use the virtual card number. In this embodiment of the present invention, the mobile phone 102 cancels the authority 2 of the smart watch 1011.

Likewise, in this embodiment of the present invention, that the mobile phone 102 updates the authority of the smart watch 1011 to use the virtual card number may also be implemented by modifying local data. For details, refer to descriptions in the foregoing embodiment.

In this embodiment of the present invention, because the manner of updating the use authority by the mobile phone 102 is only modifying the local data without changing network data, the mobile phone 102 needs to notify the smart watch 1011, to prevent the smart watch 1011 from continuing to use the virtual card number according to the original use authority. In this embodiment of the present invention, after the mobile phone 102 updates the authority of the smart watch 1011 to use the virtual card number, the mobile phone 102 may send a notification message to the smart watch 1011 by using the short range communications module of the mobile phone 102, where the notification message is used to indicate that the smart watch 1011 does not have some authority to use the virtual card number any longer, and may further indicate that the canceled use authority is the authority 2.

After receiving the notification message by using the short range communications module of the smart watch 1011, the smart watch 1011 may stop using a function corresponding to the authority 2 of the virtual card number.

In addition, in an alternative solution for the solution in which the mobile phone 102 needs to notify the smart watch 1011 after updating the authority to use the virtual card number due to the location condition, the mobile phone 102 and the smart watch 1011 may negotiate in advance a manner of updating the authority to use the virtual card number because the location condition is satisfied, that is, the mobile phone 102 and the smart watch 1011 may negotiate in advance how the mobile phone 102 updates the authority to use the virtual card number due to the location condition. In this case, if the mobile phone 102 updates the authority of the smart watch 1011 to use the virtual card number due to the location condition, the smart watch 1011 may also not be notified. When the smart watch 1011 determines that the smart watch 1011 satisfies the duration condition, it may be determined that the authority to use the virtual card number is already updated.

An embodiment of the present invention provides an embodiment of a method for managing an allocated virtual card number by a mobile phone 102. This embodiment of the present invention focuses on how the mobile phone 102 manages the allocated virtual card number according to the foregoing short range communications connection condition. In this embodiment of the present invention, a smart watch 1011 used as a first device has received a virtual card number allocated by the mobile phone 102, and can perform communication by using the virtual card number in a network provided by a mobile communications operator.

After the mobile phone 102 allocates the virtual card number to the smart watch 1011, a short range communications module of the mobile phone 102 determines that a short range communications connection to the smart watch 1011 is broken. For example, the mobile phone 102 or the smart watch 1011 moves, and after the movement, a distance between the mobile phone 102 and the smart watch 1011 increases and exceeds a communication distance supported by a short range communications protocol. Therefore, the short range communications connection between the mobile phone 102 and the smart watch 1011 is broken.

Because the short range communications connection to the smart watch 1011 is broken, and it is inconvenient to control use of the virtual card number by the smart watch 1011, the mobile phone 102 determines that the smart watch 1011 satisfies a condition for updating authority to use the virtual card number allocated to the smart watch 1011. In this case, the mobile phone 102 updates the authority of the smart watch 1011 to use the virtual card number. In this embodiment of the present invention, that the mobile phone 102 updates the authority of the smart watch 1011 to use the virtual card number is implemented in the following manner: A processor 390 of the mobile phone 102 generates a trigger instruction after determining that the smart watch 1011 satisfies the condition for updating the authority to use the virtual card number allocated to the smart watch 1011. The processor 390 executes the trigger instruction to send, by using a radio frequency unit 310, to a server provided by the mobile communications operator, a request message used to request to modify the authority to use the virtual card number. After receiving the request message, the server may modify the authority to use the virtual card number on a network side, that is, modify network data, so that the condition for updating the authority to use the virtual card number is satisfied.

In this embodiment of the present invention, the mobile phone 102 selects to recycle the virtual card number allocated to the smart watch 1011. Because the network data is directly modified, after the network data is modified, the smart watch 1011 cannot directly use the virtual card number again, and the mobile phone 102 also does not need to notify the smart watch 1011 additionally.

In addition, in this embodiment of the present invention, the mobile phone 102 selects to recycle the virtual card number allocated to the smart watch 1011. In this case, the mobile phone 102 may select to allocate the recycled virtual card number to another first device.

After the mobile phone 102 recycles the virtual card number allocated to the smart watch 1011, the short range communications module of the mobile phone 102 determines that the short range communications connection between the mobile phone 102 and the smart watch 1011 is restored. For example, the smart watch 1011 or the mobile phone 102 moves, and after the movement, a distance between the smart watch 1011 and the mobile phone 102 is shortened and satisfies a requirement of the short range communications protocol on the distance again, and both the smart watch 1011 and the mobile phone 102 reserve connection information such as peer names. Therefore, after the distance satisfies the requirement again, the short range communications connection between the mobile phone 102 and the smart watch 1011 may be restored automatically.

In this case, the mobile phone 102 determines that the smart watch 1011 satisfies again the condition for updating the authority to use the virtual card number allocated to the smart watch 1011, and the mobile phone 102 updates again the authority of the smart watch 1011 to use the virtual card number. Because the mobile phone 102 previously selects to recycle the virtual card number allocated to the smart watch 1011, that the mobile phone 102 updates again the authority of the smart watch 1011 to use the virtual card number may be that a virtual card number is allocated to the smart watch 1011 again. If the virtual card number previously recycled from the smart watch 1011 is not allocated to another first device, the mobile phone 102 may select to reallocate the virtual card number to the smart watch 1011. If the virtual card number previously recycled from the smart watch 1011 is already allocated to another first device, the mobile phone 102 may reallocate another virtual card number to the smart watch 1011, or even if the previously recycled virtual card number is not allocated to another first device, the mobile phone 102 may reallocate another virtual card number to the smart watch 1011. That the mobile phone 102 updates again the authority of the smart watch 1011 to use the virtual card number may be still implemented by modifying network data by using the server. Details are not described again.

With reference to accompanying drawings, the following describes devices provided by embodiments of the present invention.

Figure 8:
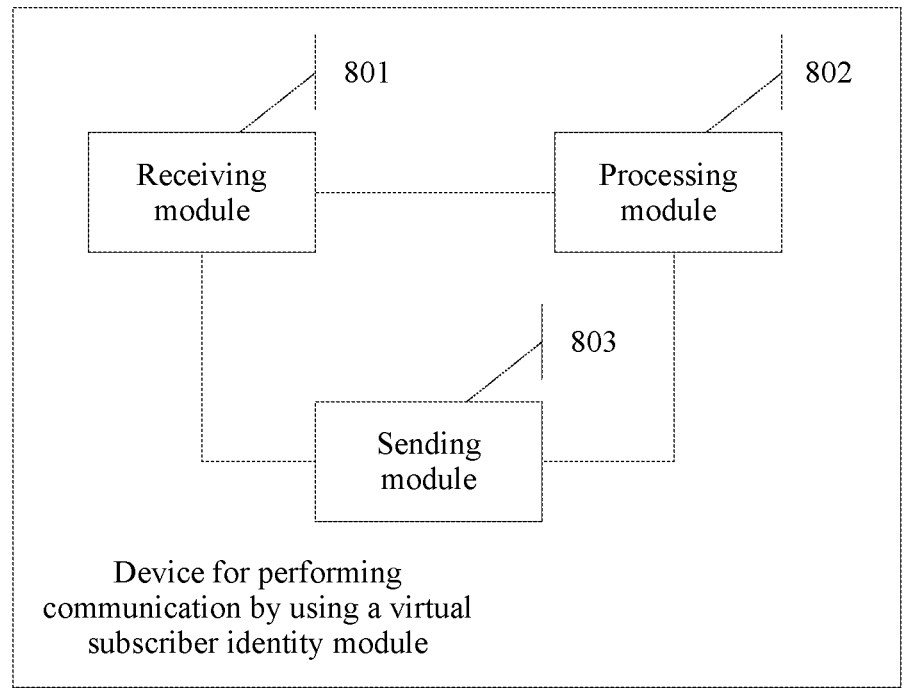
FIG. 8 is a schematic structural diagram of a device for performing communication by using a virtual subscriber identity module according to an embodiment of the present invention.

Referring to FIG. 8, an embodiment of the present invention provides another device for performing communication by using a virtual subscriber identity module. The device may include a receiving module 801 and a processing module 802.

The receiving module 801 is configured to receive a virtual subscriber identity module data package sent by a second device by using a short range communications protocol, where the virtual subscriber identity module data package carries a virtual subscriber identity, and the virtual subscriber identity is used to uniquely identify a user using a first device when the first device performs communication in a network provided by a mobile communications operator. The processing module 802 is configured to obtain the virtual subscriber identity by using the virtual subscriber identity module data package. The processing module 802 is further configured to communicate with another device by using the virtual subscriber identity in the network provided by the mobile communications operator.

In an implementation, the receiving module 801 is further configured to receive a virtual subscriber identity module installation package sent by the second device by using the short range communications protocol; and the processing module 802 is further configured to run the virtual subscriber identity module installation package to obtain the installed virtual subscriber identity module.

In an implementation, that the processing module 802 obtains the virtual subscriber identity by using the virtual subscriber identity module data package may be implemented in the following manner: The processing module 802 obtains the virtual subscriber identity carried in the virtual subscriber identity module data package.

In an implementation, the device may further include a sending module 803, as shown in FIG. 8. That the processing module 802 obtains the virtual subscriber identity by using the virtual subscriber identity module data package may also be implemented in the following manner: The processing module 802 obtains check information carried in the virtual subscriber identity module data package, where the check information is used by the first device to obtain the virtual subscriber identity. The processing module 802 sends, by using the sending module 803, to a server provided by the mobile communications operator, request information used to request to obtain the virtual subscriber identity, where the request information carries the check information. The processing module 802 receives the virtual subscriber identity sent by the server after the check information is verified successfully.

In an implementation, the processing module 802 is further configured to obtain time information carried in the virtual subscriber identity module data package, and determine, according to the time information, a term of authority to use the virtual subscriber identity.

In an implementation, the processing module 802 is further configured to obtain location information carried in the virtual subscriber identity module data package, where the location information is associated with the term of the authority to use the virtual subscriber identity. The processing module 802 determines, according to the location information, the authority to use the virtual subscriber identity.

In an implementation, the processing module 802 is further configured to determine that a short range communications connection to the second device is broken, and determine to stop using all or some functions of the virtual subscriber identity, or determine to stop using the virtual subscriber identity.

In an actual implementation, a physical device corresponding to the receiving module 801 may be any short range communications module in FIG. 2, for example, may be the Wi-Fi module 270, or may be the Bluetooth module 280, or may be the NFC module 250, or may be another possible short range communications module. A physical device corresponding to the processing module 802 may be the processor 290 in FIG. 2. A physical device corresponding to the sending module 803 may be the radio frequency unit 210 in FIG. 2.

In addition, in an actual implementation, the device may further send a message to the second device by using the short range communications protocol. In this case, the receiving unit 801 may also have a sending function, that is, may send a message to the second device by using the short range communications protocol. Alternatively, the device may have an additional functional module configured to send a message to the second device by using the short range communications protocol, and a physical device corresponding to the functional module may be any short range communications module in FIG. 2, for example, may be the Wi-Fi module 270, or may be the Bluetooth module 280, or may be the NFC module 250, or may be another possible short range communications module. In an actual implementation, the device may further receive a message sent by the server provided by the mobile communications operator. In this case, the sending module 803 may also have a receiving function, that is, may receive a message sent by the server provided by the mobile communications operator. Alternatively, the device may have an additional functional module configured to receive a message sent by the server provided by the mobile communications operator, and a physical device corresponding to the functional module may be the radio frequency unit 210 in FIG. 2.

The device may be configured to perform the methods in the foregoing embodiments, for example, may be the first device as described above. Therefore, for functions implemented by all units in the device, refer to descriptions about the foregoing methods. Details are not described again.

Figure 9:
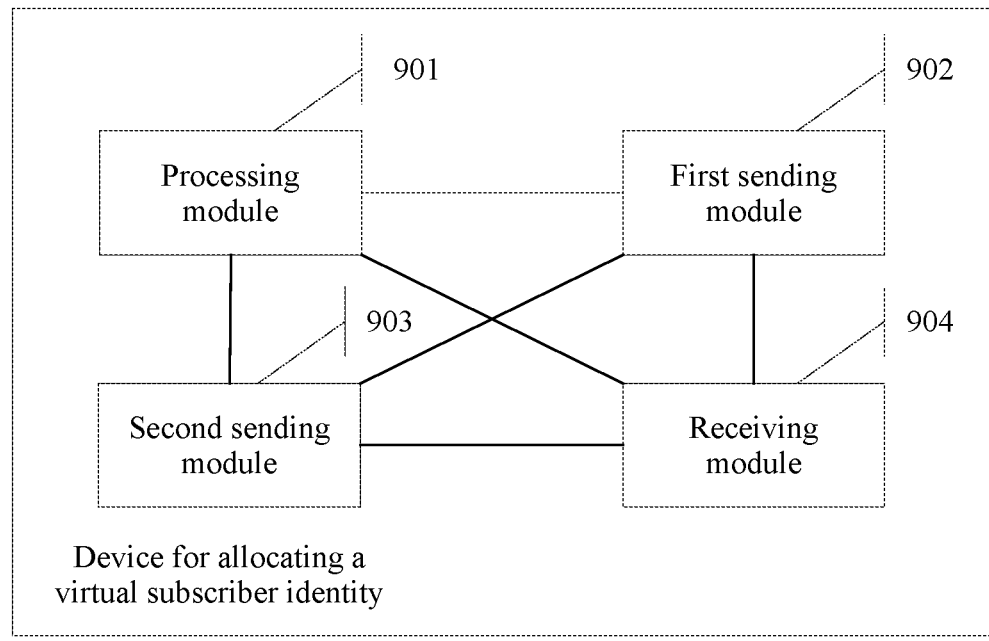
FIG. 9 is a schematic structural diagram of a device for allocating a virtual subscriber identity according to an embodiment of the present invention.

Referring to FIG. 9, an embodiment of the present invention provides another device for allocating a virtual subscriber identity. The device may include a processing module 901 and a first sending module 902.

The processing module 901 is configured to generate a virtual subscriber identity module data package, where the virtual subscriber identity module data package carries a virtual subscriber identity, and the virtual subscriber identity is used to perform communication in a network provided by a mobile communications operator. The first sending module 902 sends the virtual subscriber identity module data package to a first device by using a short range communications protocol.

In an implementation, the first sending module 902 is further configured to send a virtual subscriber identity module installation package to the first device by using the short range communications protocol, where the virtual subscriber identity module installation package is used to obtain an installed virtual subscriber identity module after the first device runs the virtual subscriber identity module installation package, and the virtual subscriber identity module is a software package used to process the virtual subscriber identity module data package and obtain the virtual subscriber identity.

In an implementation, the device further includes a second sending module 903 and a receiving module 904, as shown in FIG. 9. The second sending module 903 is configured to send an allocation request message to a server provided by the mobile communications operator, where the allocation request message is used to request to allocate the virtual subscriber identity. The receiving module 904 is configured to receive the virtual subscriber identity sent by the server, or check information used to obtain the virtual subscriber identity.

In an implementation, the virtual subscriber identity module data package carries time information, and the time information is used to indicate a term of authority to use the virtual subscriber identity.

In an implementation, the virtual subscriber identity module data package carries location information, and different location information corresponds to different authority to use the virtual subscriber identity.

In an implementation, the processing module 901 is further configured to determine that a short range communications connection between the first device and the second device is broken, and update the authority to use the virtual subscriber identity, so that the first device stops using all or some functions of the virtual subscriber identity or that the first device stops using the virtual subscriber identity.

In an actual implementation, a physical device corresponding to the receiving module 904 may be the radio frequency unit 310 in FIG. 3; a physical device corresponding to the processing module 901 may be the processor 390 in FIG. 3; a physical device corresponding to the first sending module 902 may be any short range communications module in FIG. 3, for example, may be the Wi-Fi module 370, or may be the Bluetooth module 380, or may be the NFC module 350, or may be another possible short range communications module; and a physical device corresponding to the second sending module 903 may be the radio frequency unit 310 in FIG. 3.

The device may be configured to perform the methods in the foregoing embodiments, for example, may be the second device as described above. Therefore, for functions implemented by all units in the device, refer to descriptions about the foregoing methods. Details are not described again.

An embodiment of the present invention provides another use authority control device. The device may include a processing module.

The processing module is configured to: after determining that at least one first device communicating with a second device by using a short range communications protocol obtains a virtual subscriber identity respectively, determine that a target first device satisfies a condition for updating authority to use a virtual subscriber identity; and update the authority to use the virtual subscriber identity obtained by the target first device.

In an implementation, that the processing module updates the authority to use the virtual subscriber identity obtained by the target first device may be implemented in the following manner: forbidding the target first device to use all or some functions of the obtained virtual subscriber identity; or forbidding the target first device to use the obtained virtual subscriber identity.

In an actual implementation, a physical device corresponding to the processing module may be the processor 690 in FIG. 6.

The device may be configured to perform the methods in the foregoing embodiments, for example, may be the second device as described above. Therefore, for functions implemented by all units in the device, refer to descriptions about the foregoing methods. Details are not described again.

In the embodiments of the present invention, no physical SIM card needs to be disposed in the first device. The first device can obtain the virtual subscriber identity by using the virtual subscriber identity module data package sent by the second device, and therefore can perform communication by using the virtual subscriber identity in the network provided by the mobile communications operator. This reduces dependence of the first device on a physical SIM card, and reduces hardware costs of the first device. Because no physical SIM card is required, space in the first device may also be saved. In addition, because a limitation on communication of the first device is reduced, the first device can be used more conveniently. In addition, the first device can directly communicate, by using the virtual subscriber identity, with another device in the network provided by the mobile communications operator, and no longer depends on another device serving as a relay. The communication mode is simpler and more convenient.

In the present invention, it should be understood that the disclosed device and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The embodiments of the present invention further provide a computer storage medium. The computer storage medium may store a program, and, when the program is executed, at least some or all of the steps of any method in the foregoing method embodiments may be performed.

All functional units in the embodiments of the present invention may be integrated in a processing unit, or all units may be independent physical modules.

When the integrated unit is implemented in the form of a software functional unit and sold or used as an independent product, the integrated unit may be stored in a computer-readable storage medium. Based on such an understanding, all or a part of technical solutions of the present invention may be implemented in a form of a software product. The software product is stored in a storage medium and includes several instructions for instructing a computer device, such as a personal computer, a server, a network device, or a processor (processor) to perform all or a part of the steps of the methods described in the embodiments of the present invention. The foregoing storage medium includes: any medium that can store program code, such as a Universal Serial Bus flash drive (Universal Serial Bus flash drive), a removable hard disk, a ROM, a RAM, a magnetic disk, or an optical disc.

The foregoing embodiments are merely used to describe the technical solutions of the present invention. The foregoing embodiments are merely intended to help understand the method of the embodiments of the present invention, and shall not be construed as a limitation on the embodiments of the present invention. Any variation or replacement readily figured out by a person skilled in the art shall fall within the protection scope of the embodiments of the present invention.

What is claimed is:

1. A method, comprising:
   receiving a request for allocating a virtual subscriber identity for a first device;
   allocating the virtual subscriber identity for the first device, wherein the virtual subscriber identity is corresponding to a communication number of a second device;
   establishing an association between the virtual subscriber identity of the first device and the communication number of the second device; and
   adding a first charge generated by the virtual subscriber identity to a second charge associated with the communication number of the second device according to the association when the first device accesses a network via the virtual subscriber identity.

2. The method according to claim 1, wherein the first device comprises a wearable device or a tablet computer.

3. The method according to claim 1, wherein the second device comprises a mobile phone.

4. The method according to claim 1, further comprising:
   binding the communication number and an identifier of the second device.

5. The method according to claim 1, further comprising:
   generating first information associated with the virtual subscriber identity for the first device to obtain the virtual subscriber identity.

6. The method according to claim 5, the first information comprises verification information.

7. A method comprising:
   sending, by a second device, a request for allocating a virtual subscriber identity for a first device to a server;
   sending, by the second device, a data package to the first device via a short range communications connection, wherein the data package comprises first information associated with the virtual subscriber identity corresponding to a communication number of the second device;
   receiving, by the first device, the data package from the second device via the short range communications connection;
   obtaining, by the first device, the virtual subscriber identity according to the first information in the received data package; and
   accessing, by the first device, a network via the virtual subscriber identity, wherein a first charge generated for the virtual subscriber identity when the first device accesses the network via the virtual subscriber identity is added to a second charge associated with the communication number of the second device according to an association between the virtual subscriber identity of the first device and the communication number.

8. The method according to claim 7, wherein the first device comprises a wearable device or a tablet computer.

9. The method according to claim 7, wherein the second device comprises a mobile phone.

10. The method according to claim 7, wherein the first device comprises an embedded subscriber identity module (eSIM), and wherein the virtual subscriber identity is obtained by the first device via the eSIM according to the information in the received data package.

11. The method according to claim 7, wherein the charge association is established by the server.

12. The method according to claim 7, further comprising:
controlling an authority of the first device, by the second device, to use the virtual subscriber identity.

13. The method according to claim 7, further comprising:
encrypting, by the second device, the data package.

14. A method, implemented by a first device, comprising:
receiving a data package from a second device having a communication number via a short range communications connection, wherein the data package comprises first information associated with a virtual subscriber identity corresponding to the communication number;
obtaining the virtual subscriber identity according to the first information in the received data package; and
accessing a network via the virtual subscriber identity, wherein a first charge generated for the virtual subscriber identity when the first device accesses the network via the virtual subscriber identity is added to a second charge associated with the communication number of the second device according to an association between the virtual subscriber identity of the first device and the communication number.

15. The method according to claim 14, wherein the first device comprises a wearable device or a tablet computer.

16. The method according to claim 14, wherein the first device comprises an embedded subscriber identity module (eSIM) for obtaining the virtual subscriber identity according to the first information.

17. A first device comprising:
a processor and
a memory coupled with the processor;
wherein the memory comprises instructions that, when executed by the processor, cause the first device to perform, at least, the following:
receiving a data package from a second device having a communication number via a short range communications connection, wherein the data package comprises first information associated with a virtual subscriber identity corresponding to the communication number;
obtaining the virtual subscriber identity according to the first information in the received data package; and
accessing a network via the virtual subscriber identity, wherein a first charge generated for the virtual subscriber identity when the first device accesses the network via the virtual subscriber identity is added to a second charge associated with the communication number of the second device according to an association between the virtual subscriber identity of the first device and the communication number.

18. The first device according to claim 17, wherein the first device comprises a wearable device or a tablet computer.

19. The first device according to claim 17, wherein the first device comprises an embedded subscriber identity module (eSIM) for obtaining the virtual subscriber identity according to the first information.

20. A method, implemented by a second device having a communication number, comprising:
sending a request for allocating a virtual subscriber identity for a first device to a server;
sending a data package to the first device via a short range communications connection, wherein the data package comprises first information associated with the virtual subscriber identity corresponding to the communication number; and
obtaining a bill comprising a first charge and a second charge, wherein the first charge is generated for the virtual subscriber identity when the first device accesses a network via the virtual subscriber identity, the second charge is generated by the communication number, and the first charge is added to the second charge according to an association between the virtual subscriber identity of the first device and the communication number.

21. The method according to claim 20, wherein the second device comprises a mobile phone.

22. The method according to claim 20, further comprising:
controlling an authority of the first device to use the virtual subscriber identity.

23. The method according to claim 20, further comprising:
encrypting the data package.

24. A second device comprising:
a processor and
a memory coupled with the processor;
wherein the memory comprises instructions that, when executed by the processor, cause the second device to perform, at least, the following:
sending a request for allocating a virtual subscriber identity for a first device to a server;
sending a data package to the first device via a short range communications connection, wherein the data package comprises first information associated with the virtual subscriber identity corresponding to the communication number; and
obtaining a bill comprising a first charge and a second charge, wherein the first charge is generated for the virtual subscriber identity when the first device accesses a network via the virtual subscriber identity, the second charge is generated by the communication number, and the first charge is added to the second charge according to an association between the virtual subscriber identity of the first device and the communication number of the second device.

25. The second device according to claim 24, wherein the second device comprises a mobile phone.

26. The second device according to claim 24, wherein the instructions further cause the second device to perform:
controlling an authority of the first device to use the virtual subscriber identity.

27. The second device according to claim 24, wherein the instructions further cause the second device to perform:
encrypting the data package.

28. A non-transitory computer readable medium storing a program causing a first device to perform:
receiving a data package from a second device having a communication number via a short range communications connection; wherein the data package comprises first information associated with a virtual subscriber identity corresponding to the communication number;
obtaining the virtual subscriber identity according to the first information in the received data package; and
accessing a network via the virtual subscriber identity, wherein a first charge generated for the virtual subscriber identity when the first device accesses the network via the virtual subscriber identity is added to a second charge associated with the communication number of the second device according to an association between the virtual subscriber identity of the first device and the communication number.

29. A non-transitory computer readable medium storing a program causing a second device to perform:

sending a request for allocating a virtual subscriber identity for a first device to a server;

sending a data package to the first device via a short range communications connection, wherein the data package comprises first information associated with the virtual subscriber identity corresponding to the communication number; and obtaining a bill comprising a first charge and a second charge, wherein the first charge is generated for the virtual subscriber identity when the first device accesses a network via the virtual subscriber identity, the second charge is generated by a communication number of the second device, and the first charge is added to the second charge according to an association between the virtual subscriber identity of the first device and the communication number.

* * * * *